US012800245B2

(12) United States Patent
Zink

(10) Patent No.: US 12,800,245 B2
(45) Date of Patent: Nov. 17, 2026

(54) E-TRAC TRACTOR DEVICE AND METHOD OF USE

(71) Applicant: STONEAGE, INC., Durango, CO (US)

(72) Inventor: Gerald P. Zink, Durango, CO (US)

(73) Assignee: STONEAGE, INC., Durango, CO (US)

( * ) Notice: Subject to any disclaimer, the term of this patent is extended or adjusted under 35 U.S.C. 154(b) by 0 days.

(21) Appl. No.: 19/181,855

(22) Filed: Apr. 17, 2025

(65) Prior Publication Data

US 2026/0049779 A1 Feb. 19, 2026

Related U.S. Application Data

(60) Provisional application No. 63/635,201, filed on Apr. 17, 2024.

(51) Int. Cl.

| | |
|---|---|
| ***F28G 15/04*** | (2006.01) |
| ***F16D 1/112*** | (2006.01) |
| ***F16D 1/116*** | (2006.01) |
| ***F16H 19/02*** | (2006.01) |
| ***F28G 1/16*** | (2006.01) |
| *F16D 1/10* | (2006.01) |
| *F16H 57/02* | (2012.01) |

(52) U.S. Cl.

CPC .............. *F28G 15/04* (2013.01); *F16D 1/112* (2013.01); *F16D 1/116* (2013.01); *F16H 19/02* (2013.01); *F28G 1/163* (2013.01); *F16D 2001/102* (2013.01); *F16D 2001/103* (2013.01); *F16H 57/02* (2013.01); *F16H 2057/02034* (2013.01); *F16H 2057/02073* (2013.01)

(58) Field of Classification Search

CPC .......... F28G 15/04; F28G 1/163; F16D 1/112; F16D 1/116; F16H 19/02

USPC ........................................................ 227/138

See application file for complete search history.

(56) References Cited

U.S. PATENT DOCUMENTS

| | | | | |
|---|---|---|---|---|
| 8,048,234 | B2 * | 11/2011 | Jacquinet | B08B 9/045 134/22.12 |
| 9,630,801 | B2 * | 4/2017 | Barnes | B65H 51/10 |
| 11,530,885 | B2 * | 12/2022 | Verstraeten | B08B 9/0433 |
| 2012/0067370 | A1 | 3/2012 | Crock et al. | |
| 2016/0023264 | A1 | 1/2016 | Barnes | |
| 2017/0102195 | A1 | 4/2017 | Watkins | |
| 2018/0161833 | A1 | 6/2018 | Zink et al. | |

* cited by examiner

*Primary Examiner* — Nathaniel C Chukwurah

(74) *Attorney, Agent, or Firm* — Sand, Sebolt & Wernow Co., LPA

(57) ABSTRACT

A compact flexible lance propelling drive device is disclosed that is mountable on a pipe end or may be configured on its own integral tubular frame. The device includes a motor driven gearworks contained in a main gearbox and two sets of roller assemblies configured in a side-by-side arrangement and connected to and selectively driven by the gearworks. Each roller assembly set comprises an upper and a lower roller assembly configured in a fixed vertical arrangement, wherein each roller assembly comprises an adjustable split-sheave configuration that includes a first roller half having a first contact face and a second roller half having an opposing second contact face and a means for independently closing a gap between the first and second roller halves so that the opposing contact faces of said first and second roller halves engage the surface of said flexible lance, clamping the flexible lance between the upper and lower roller assembly.

30 Claims, 31 Drawing Sheets

Fig. 4A
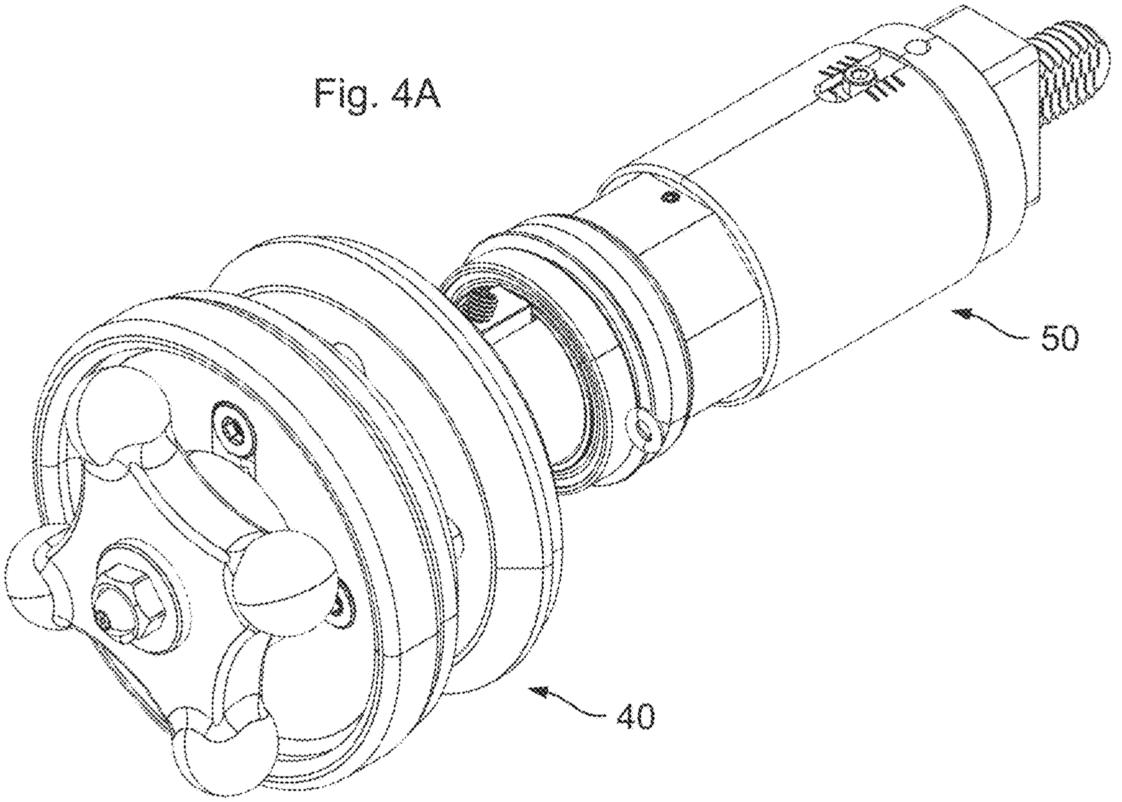
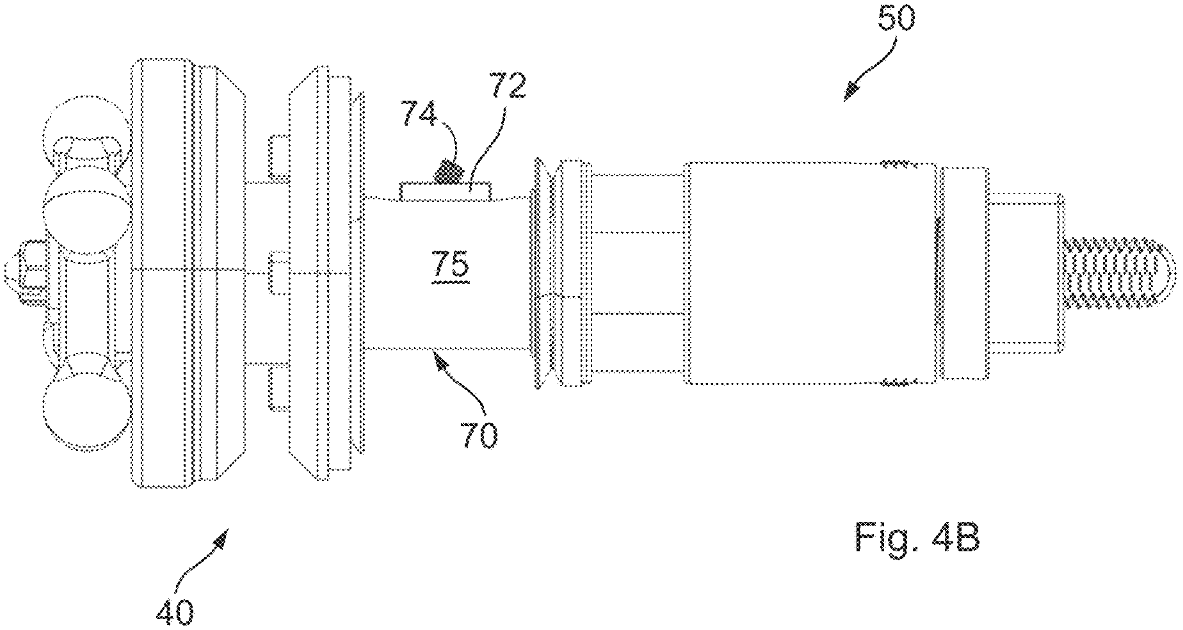
Fig. 4B

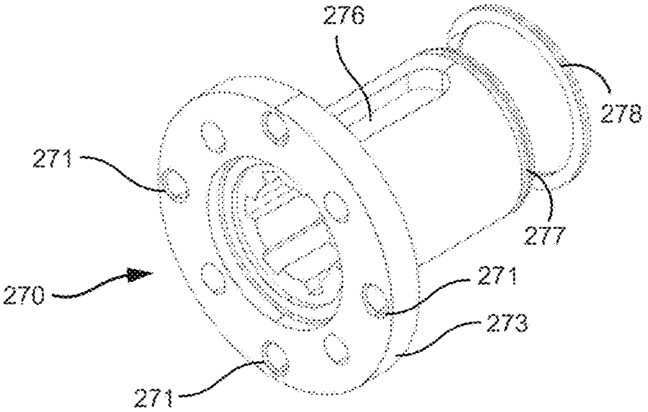
Fig. 15A
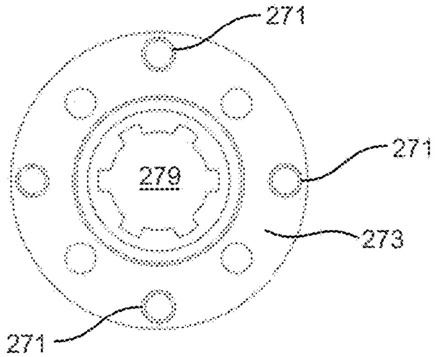
Fig. 15B
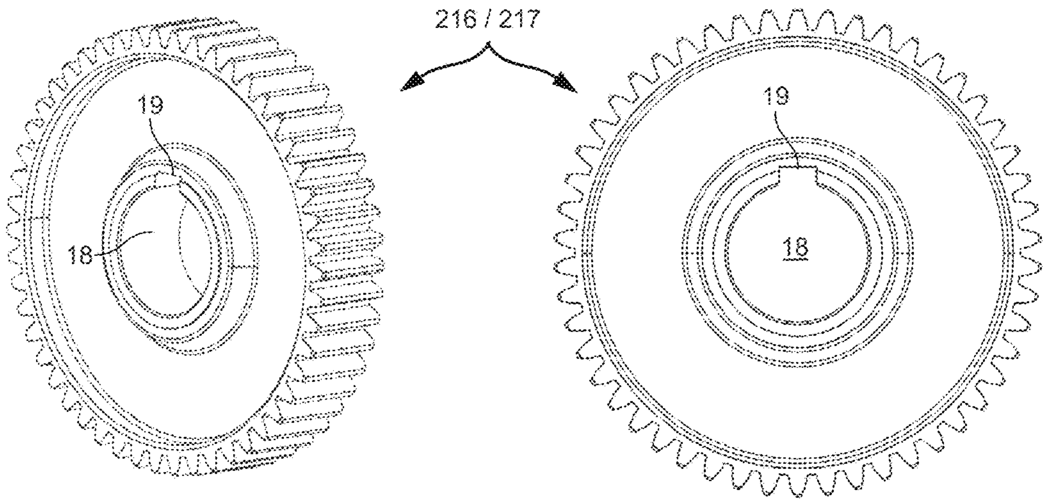
Fig. 16A
Fig. 16B

E-TRAC TRACTOR DEVICE AND METHOD OF USE

CROSS-REFERENCE TO RELATED APPLICATION

This application claims the benefit of and priority to a U.S. Provisional Patent Application No. 63/635,201 filed Apr. 17, 2024, the technical disclosure of which is hereby incorporated herein by reference.

TECHNICAL FIELD

The present disclosure is directed to high pressure fluid handling systems. In particular, embodiments of the present disclosure are directed to an apparatus for remotely advancing and retracting a flexible cleaning lance and/or hose into a piping system to be cleaned.

BACKGROUND OF THE INVENTION

One conventional tube lancing apparatus is described in U.S. Patent publication No. 2015/0068563 published Mar. 12, 2015. Such a system includes a take-up reel for lance hose, a lance feed motor, and a mounting frame fastened to, in this case, a tube sheet of a heat exchanger bundle.

For cleaning a piping system or tube bundle, a user typically will install a back-out preventer and splash shield to the end of the pipe or tube to be cleaned and push a handheld cleaning lance or hose into the piping system to be cleaned. This requires the user to stand relatively close to the back-out preventer, hence in the path of potentially dangerous fluid back flow and debris out of the piping system. In order for a user to get back out of the splash zone an elaborate frame system must be erected to which a flexible lance feed system is installed.

More recently, a more automated pipe cleaning system has been disclosed in U.S. Pat. No. 10,933,453, which features a compact flexible lance propelling apparatus that is mountable on a pipe end. The system includes a drive mechanism or tractor, an adaptable support that can be fastened directly to the pipe end which carries the drive mechanism, a remote-control console, and a hose take-up drum spaced from the drive mechanism. The drive mechanism includes a driven roller and a follower roller sandwiching the flexible lance hose therebetween and a rotary cam lift mechanism for linearly raising the follower roller to permit insertion of the flexible lance hose and lowering the follower roller against the driven roller.

While the lance propelling apparatus of the ’453 patent is a notable advancement in the field of automated pipe cleaning systems and provides a simple lightweight apparatus for feeding a single flexible lance and/or hose into a piping system to be cleaned that is quick to set up, adaptable to a variety of pipe system configurations, and which can be remotely operated from a distanced spaced from the splash zone, a number of limitations in the propelling apparatus of the ’453 apparatus have arisen in the field. For example, since the drive mechanism consists of only a driven roller and a follower roller sandwiching the flexible lance hose therebetween, a positive hold on the flexible lance cannot be maintained when a larger coupling is fed through the two rollers. Moreover, tools cannot be assembled and attached to the flexible lance hose until the flexible lance hose is first clamped between the driven roller and the follower roller. In addition, the direction for feeding the flexible lance hose into the drive mechanism is limited to a single direction, in-line with the configuration of the inlet and outlet fittings of the tractor device. Furthermore, the rollers are limited to a specifically sized hose which may be clamped there-between. What is needed is a more adaptable and flexible tractor assembly capable of maintaining a positive hold on the flexible lance hose at more than one point along its length, that allows for larger couplings to pass through the roller devices while maintaining a positive hold on the flexible lance hose. In addition, rollers of the more flexible and robust tractor assembly of the present invention must be capable of more easily handling a variety of hose diameters while maintaining a positive hold thereon. Finally, the robust tractor assembly of the present invention must be capable of loading the flexible lance hose in more than one direction.

SUMMARY OF THE INVENTION

The present invention relates to an improved tractor drive device designed to be interchangeable with many tractor drive devices of prior art pipe cleaning systems, but offering greater flexibility and control. In one example, the tractor device may be used to drive a flexible lance into and out of the pipe to be cleaned.

The tractor drive device comprises a main gearbox containing a gearworks for driving two sets of adjustable split-sheave roller assemblies. In a first embodiment, the adjustable split sheave roller assemblies are each attached to a separate adjustable preload mechanism. In a second embodiment, the adjustable split sheave roller assemblies are rotatively connected by means of a connecting spindle shaft mechanism configured between the pair of adjacent gearbox hubs. The sets of roller assemblies are configured in a side-by-side arrangement. The main gearbox is powered by a single motor. The tractor drive device may further include a stabilizing tubular frame fixably attached to the main gearbox and a sealed motor housing containing a drive motor and a motor brake mechanism. The sealed motor housing may be pressurized with an inert gas to protect the electrical components from the incursion of moisture or explosive or corrosive gases. The sealed motor housing may also include a hermetically sealable access point for connecting electrical and control cords to the drive motor.

Each set or pair of adjustable split-sheave roller assemblies is configured in a fixed vertical arrangement to one another, such that a flexible lance may be clamped between them. Each adjustable split-sheave roller assembly includes two separate roller halves or sheaves for interfacing with or engaging the flexible lance. In the first embodiment, each split-sheave roller assembly is selectively attached to a splined shaft or spindle of its respective adjustable preload mechanism. The adjustable preload mechanism is used to adjust the lateral distance between the roller halves by adjusting the length of a splined shaft or spindle extending through its respective aperture in the main gearbox. The splined shaft of spindle is connected via a hub assembly to the gearworks within the main gearbox. Each hub assembly includes a splined bore complementary to the cross-section of the splined shaft or spindle. In the second embodiment, a first split-sheave roller half is attached to a first gearbox hub configured in its respective co-aligned apertures in the main gearbox while a matching or second split-sheave roller half is attached to a second gearbox hub configured in its respective aperture in the upper or lower clamp housing. The respective matching apertures in the main gearbox and upper or lower clamp housing are co-axially aligned. Each of the split-sheave roller halves is rotatively coupled to its matching co-aligned roller half by means of a connector rod or shaft configured between the pair of adjacent gearbox hubs. Separate adjustable clamping mechanisms configured in each of the upper and lower clamp housings are used to adjust the lateral distance between the roller halves by adjusting the lateral distance of the upper and lower clamp housing from the main gearbox. Each hub assembly includes a splined bore complementary to the cross-section of a splined insert connected to the connecting spindle shaft mechanism.

Each roller assembly engages the surface of the flexible lance at two points about the periphery of the flexible lance to securely hold the flexible lance between an upper and lower roller assemblies. While each contact face may comprise a curved shape complementary to a quarter of the peripheral surface of the flexible lance, in a preferred embodiment, the contact face of each roller half or sheave is beveled at an acute angle to accommodate a wide variety of lance hose diameter by adjusting the lateral distance between the roller halves or sheaves. Typically, the two sets or pairs of roller assemblies are sufficiently spaced from each other so that a coupling or small tool may be configured on the flexible lance without touching or interfering with either pair of roller assemblies.

The four roller assemblies may be surrounded or shielded by a common safety cover to prevent foreign objects from being caught up between the roller assemblies and the flexible lance. In the first embodiment, each roller assembly is surrounded by a separate roller safety cover selectively attached to the main gearbox. Each roller safety cover may include a perforated circular segment cover guard selectively attached to the main gearbox. The separate roller safety covers enhance the overall safety of the tractor drive device by enabling a user to access an individual roller assembly with minimum exposure to the other roller assemblies. In the second embodiment, the upper and lower roller assembly halves are contained within the structure of its respective upper or lower clamp housings, which, when stopped, can be pivoted away from the main gearbox enabling a user to safely access either the upper or lower split-sheave roller assemblies.

The ability of the split-sheave roller assembly to quickly clamp and release the flexible lance or hose greatly enhances the utility, safety and effectiveness of the tractor drive device of the present invention. Moreover, the arrangement of the gearworks in the main gearbox greatly simplifies the operation of the subject tractor drive device. All four split-sheave roller assemblies are geared together advancing and retracting the flexible lance or hose in the same direction, at the same speed and driven by a single drive motor. Moreover, the flexible lance or hose can be fed either longitudinally (i.e., inline with its length) into the roller assemblies of the tractor drive device or laterally by temporarily removing or pivoting the outboard/front roller half out of the way of two of the top or bottom split-sheave roller assemblies. Moreover, a flexible lance or hose pre-fitted with a tool having a diameter larger than the entrance diameter of a stub tube clamp fitting to be easily inserted laterally into the roller assemblies of the tractor drive device when the front half of the stub tube clamp fitting is either be removed completely or pivoted out of the way.

Further features, advantages, and characteristics of the embodiments of this disclosure will be apparent from reading the following detailed description when taken in conjunction with the drawing figures.

BRIEF DESCRIPTION OF THE DRAWINGS

A more complete understanding of the method and apparatus of the present invention may be had by reference to the following detailed description when taken in conjunction with the accompanying drawings, wherein:

FIG. 4A is a front perspective view of a preload shaft mechanism and its attached adjustable split-sheave roller assembly shown in FIG. 1.

FIG. 4B is a side view thereof.

FIG. 15A is a front perspective view of a gearbox hub assembly.

FIG. 15B is front elevation view thereof.

FIG. 16A is a front perspective view of a main gearbox gear.

FIG. 16B is a front elevation view thereof.

Figure 1A:
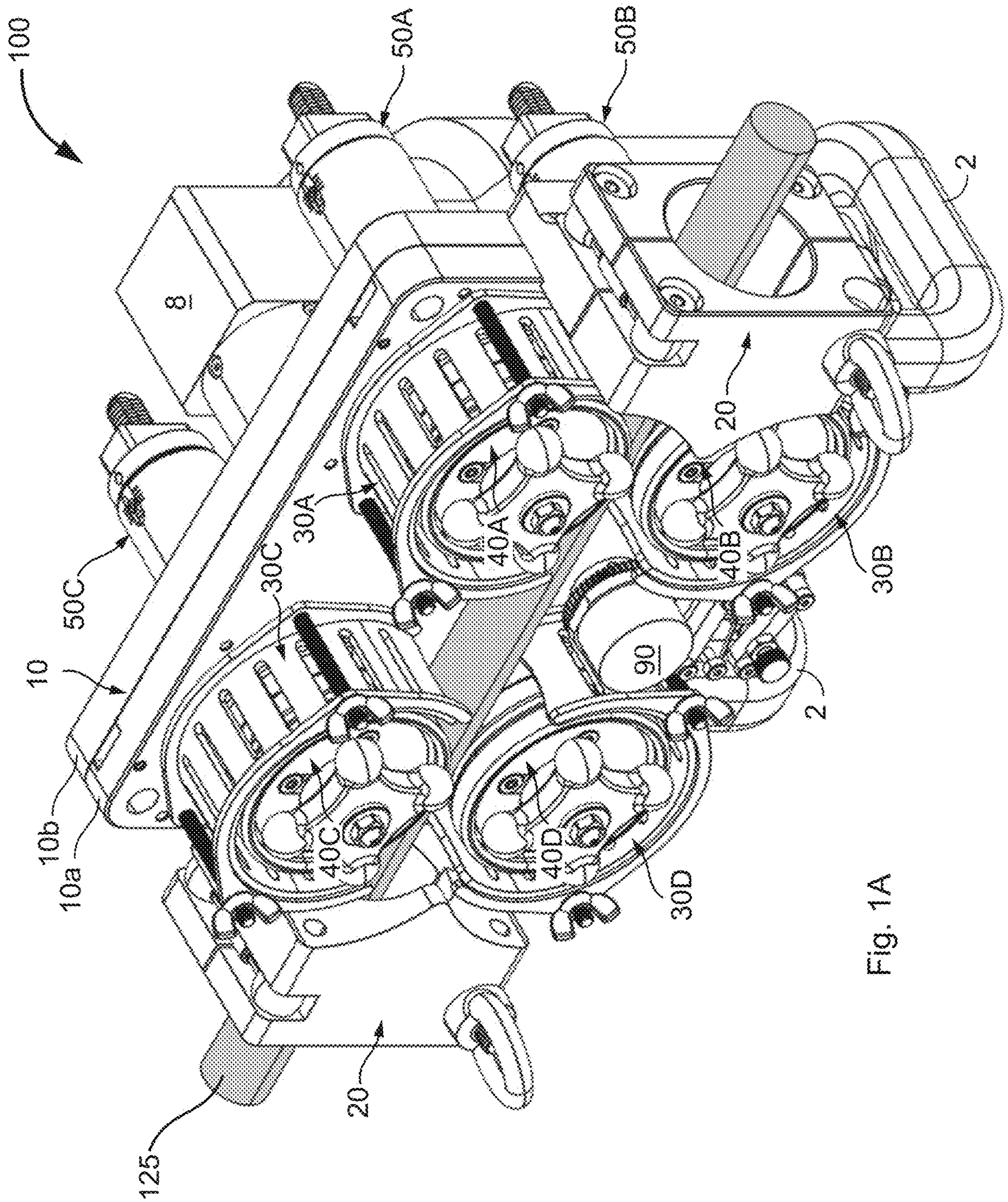
FIG. 1A is a perspective front view of a first embodiment of an exemplary drive mechanism or tractor device in accordance with the present disclosure.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

Figure 2A:
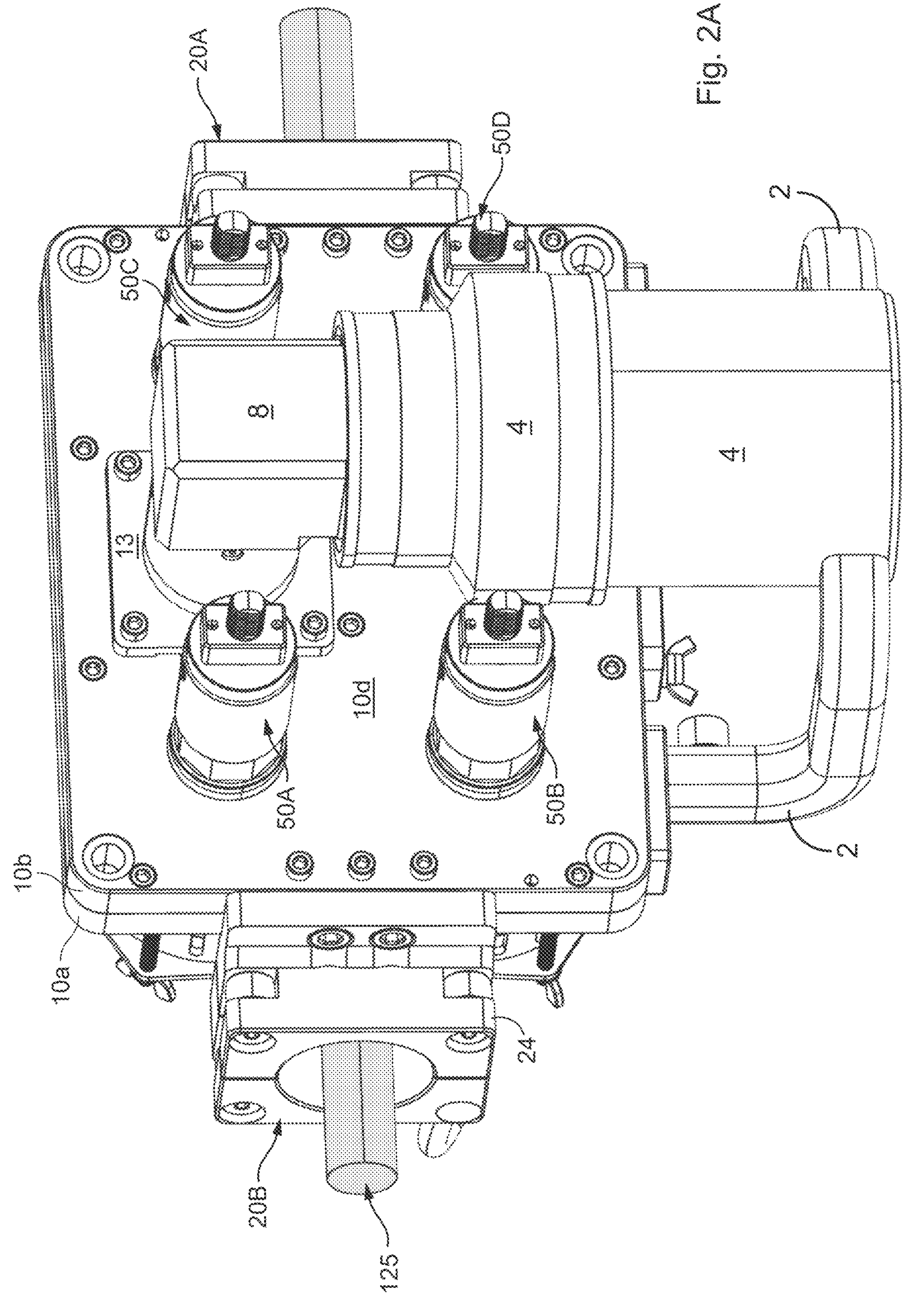
FIG. 2A is a perspective rear view of the tractor device shown in FIG. 1A.

A first embodiment of an exemplary tractor drive device 100 in accordance with the present disclosure is shown in a front perspective view in FIG. 1A. This tractor drive device 100 is shown in a rear perspective view in FIG. 2A. The tractor device 100 of the present invention may be configured within a pipe cleaning system in much the same manner as the tractor drive device specified in the previously referenced '453 patent depending on the environment surrounding the end of the particular pipe that is to be cleaned. Indeed, the first embodiment of the tractor device 100 of the present invention is configured to be interchangeable with (i.e., replace/upgrade) the tractor drive device of the pipe cleaning system of the previously referenced '453 patent. Thus, the pipe cleaning system which incorporates the tractor device 100 of the present invention may further include a winch pipe clamp assembly (not shown) that fastens a support tube positioner arm (not shown) to the pipe, a tractor support member (not shown) fastened to the positioner arm (not shown), and a back-out preventer collet block (not shown) fastened to the support member (not shown). The tractor device 100 drives the flexible lance 125 into and out of the pipe to be cleaned.

With reference to FIGS. 1A-1C, 2A, 3A-3C the first embodiment of the tractor drive device 100 comprises a main gearbox 10 containing a gearworks for driving two sets of adjustable split-sheave roller assemblies 40A/40B, 40C/40D, which are each attached to a separate adjustable preload mechanism 50. Each set or pair of adjustable split-sheave roller assemblies 40A/40B, 40C/40D is configured in a fixed vertical arrangement to one another, such that a flexible lance 125 may be clamped between them. Each adjustable split-sheave roller assembly 40 includes two separate roller halves or sheaves 60, 64 for interfacing with or engaging the flexible lance 125. Each split-sheave roller assembly 40 is selectively attached to a splined shaft or spindle 51 of its respective adjustable preload mechanism 50. The adjustable preload mechanism 50 is used to adjust the lateral distance between the roller halves 60, 64 by adjusting the length of a splined shaft or spindle 51 extending through its respective aperture 28 in the main gearbox 10. The separate roller halves or sheaves 60, 64 are typically constructed of a hard metal with texturing slats 69 formed either into or extending out of the opposing contact faces 60*a*, 64*b* of the separate roller halves or sheaves 60, 64. While in one variant, each opposing contact face may comprise a curved shape complementary to a quarter of the peripheral surface of the flexible lance 125, such a roller half is only suitable for a single diameter flexible lance 125 requiring a separate pair of roller halves or sheaves 60, 64 for each particularly sized flexible lance 125. Thus, in a preferred embodiment, the opposing contact faces 60*a*, 64*b* are beveled at an acute angle to accommodate a wider variety of lance hose diameters by adjusting the lateral distance between the roller halves or sheaves 60, 64. Other embodiments of the roller halves or sheaves 60, 64 may also include urethane or silicone coatings to lessen the damage to the flexible lance or hose 125 while maintaining a firm grip.

Figure 7B:
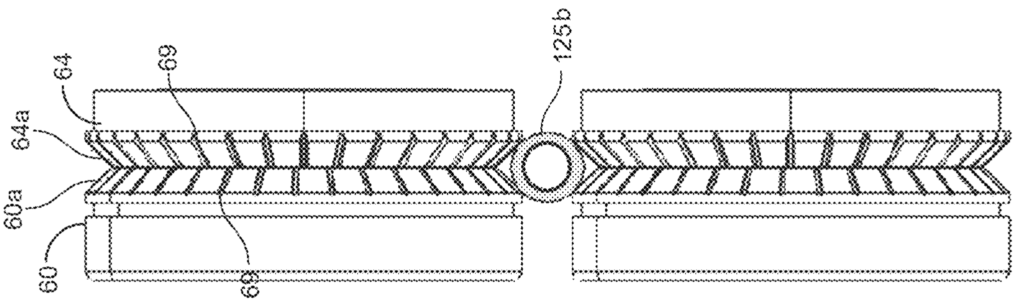
FIG. 7B is a side view of one set of the split sheaves of an upper roller and lower roller with a 15 mm diameter flexible lance hose therebetween.
Figure 7A:
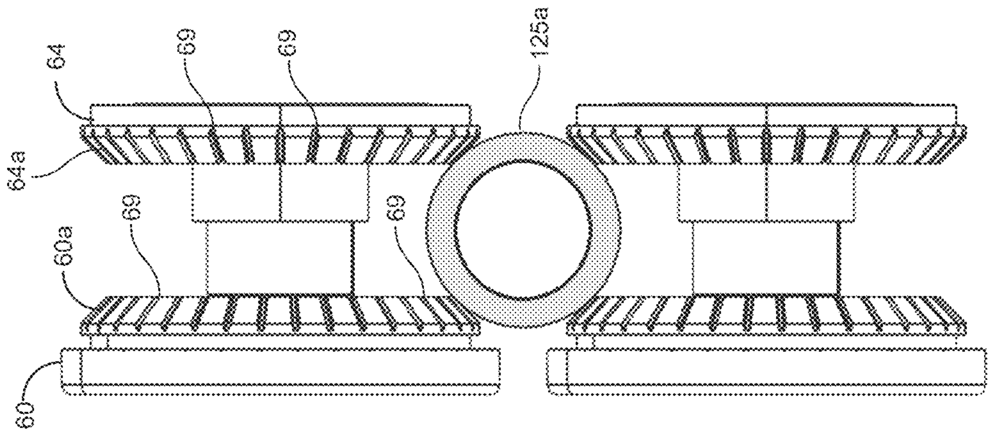
FIG. 7A is a side view of one set of the split sheaves of an upper roller and lower roller with 40 mm diameter flexible lance hose therebetween.

Each roller assembly 40 engages the surface of the flexible lance 125 at two points about the periphery of the flexible lance 125 to securely hold the flexible lance 125 between an upper and lower roller assemblies 40. (See FIGS. 7A-7B) Typically, the two sets or pairs of roller assemblies 40A/40B, 40C/40D are sufficiently spaced from each other so that a coupling or small tool may be configured on the flexible lance 125 without touching or interfering with either pair of roller assemblies 40. An encoder device 90 may also be configured in the space between the lower roller assemblies 40. The encoder device 90 can be configured in a raised position so as to engage the bottom of the flexible lance 125 in order to assess the advancement and retraction of the flexible lance 125 through the tractor drive device 100. In addition, the encoder device 90 may comprise or be connected to a computerized sensor for detecting length, speed, and force of the advancement and retraction of the flexible lance 125 through the tractor drive device 100. Such generated data may be further used to control the motor 5 and other system components.

Figure 1B:
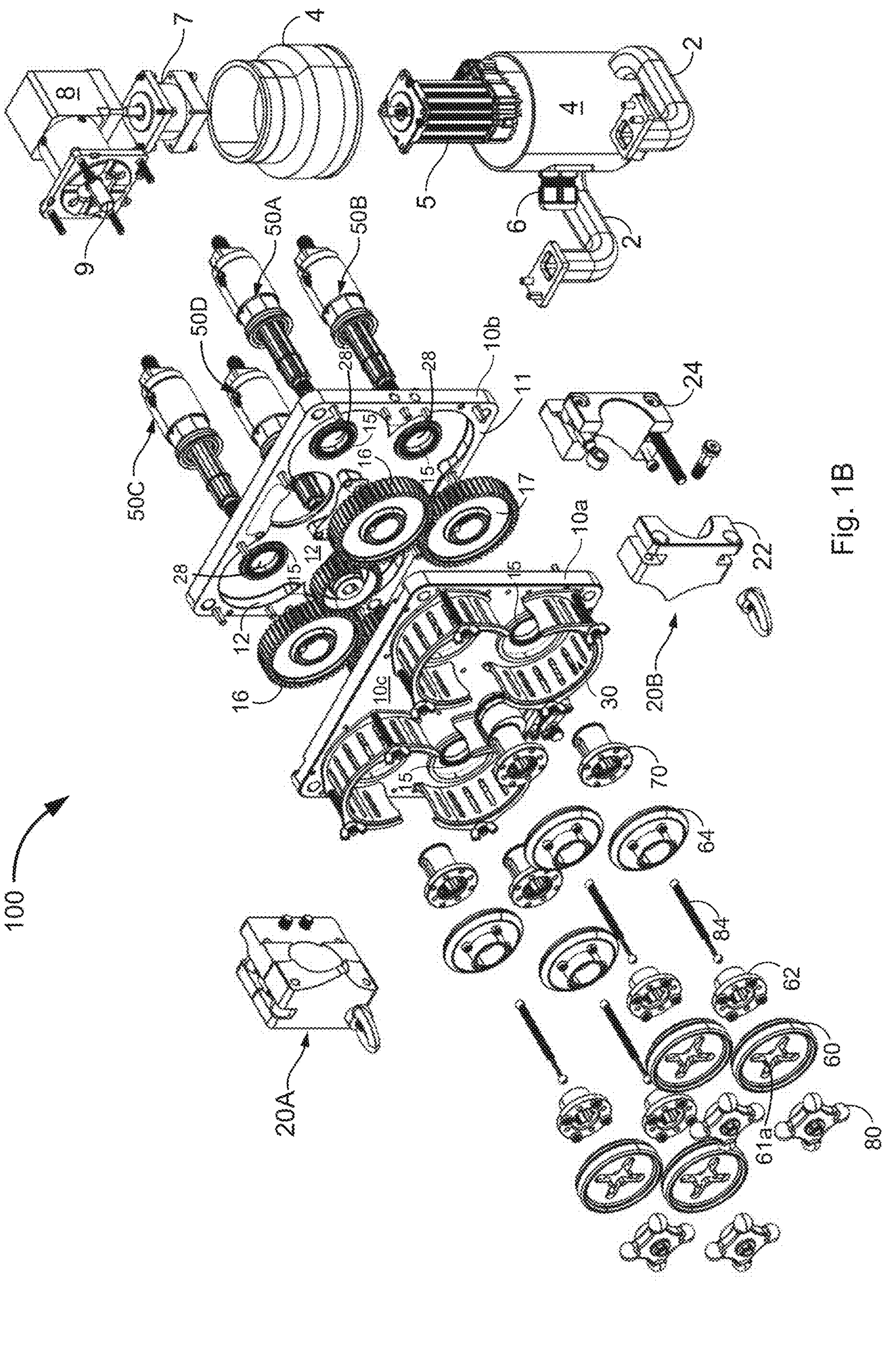
FIG. 1B is an exploded perspective front view of the tractor device shown in FIG. 1A.
Figure 1C:
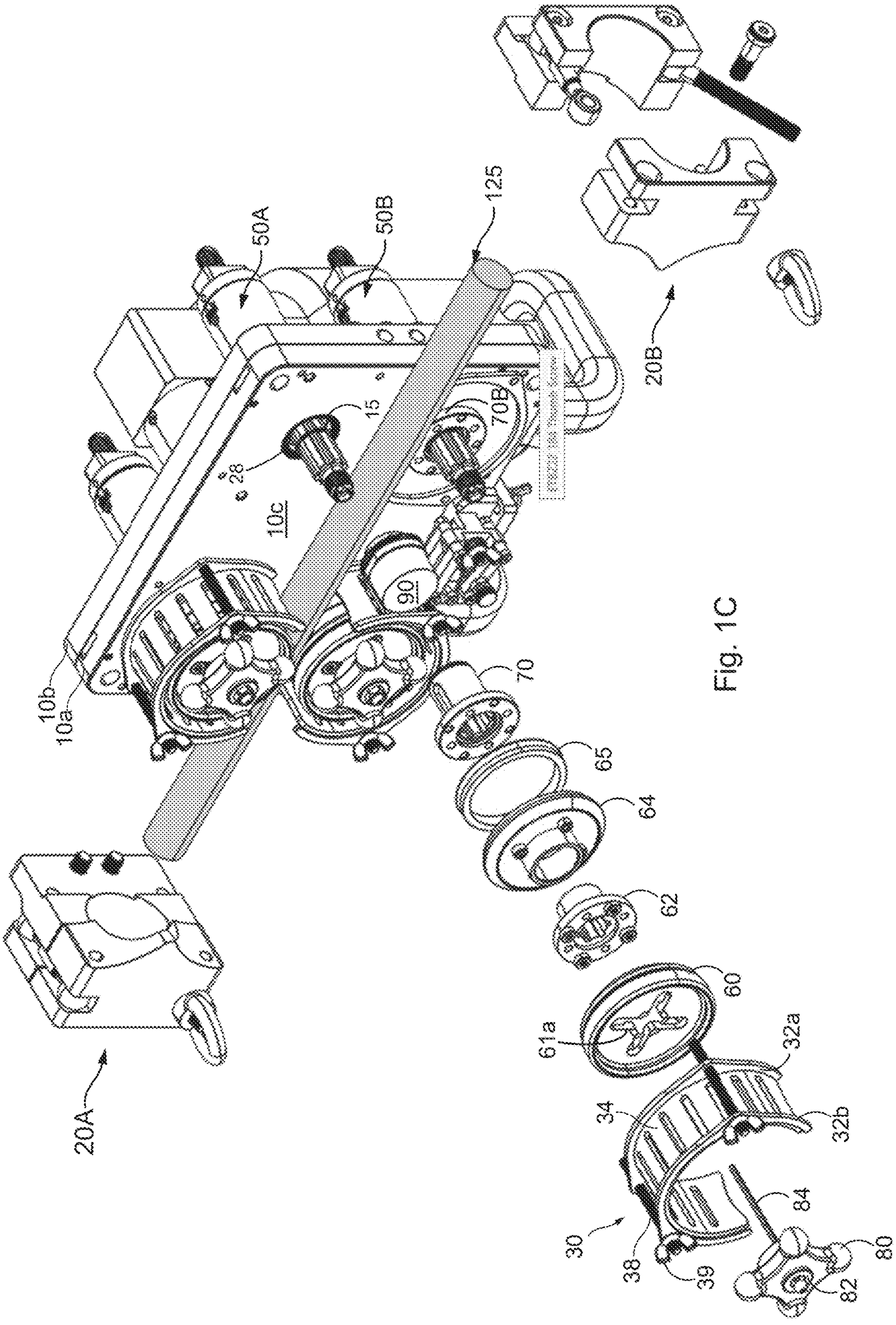
FIG. 1C is a partially exploded front perspective view of the tractor device shown in FIG. 1A.

The four roller assemblies 40A-D of the first embodiment of the tractor drive device 100 may be surrounded or covered by a common safety cover to prevent foreign objects (e.g., user's hands) from being caught up between a roller assembly 40 and the flexible lance 125. The safety cover may also include small perforations allowing a user to directly view the roller assemblies 40 and flexible lance 125. In a preferred embodiment depicted in the Figures, each roller assembly 40 of the first embodiment of the tractor drive device 100 is surrounded by a separate roller safety cover 30 selectively attached to the main gearbox 10. As shown in FIG. 1C, the roller safety cover 30 includes a perforated circular segment cover guard 34 selectively attached to the main gearbox 10. The perforated circular segment cover guard 34 is affixed to inboard 32*a* and outboard 32*b* safety cover frames, which are selectively attached to the main gearbox 10 (e.g., by means of a threaded rod 38 and wingnut 39). As will be shown, the separate roller safety covers 30 enhance the overall safety of the first embodiment of the tractor drive device 100 by enabling a user to access an individual roller assembly 40 with minimum exposure to the other roller assemblies 40.

The first embodiment of the tractor drive device 100 may further include a stub tube clamp fitting 20A, 20B attached on either or both sides of the main gearbox 10. The stub tube clamp fitting 20 may be used to attach the tractor drive device 100 to a support member and for channeling the flexible lance 125 longitudinally (i.e., inline with its length) into the roller assemblies 40. For example, as depicted in FIG. 1B, the tractor drive device 100 may include one or more stub tube clamp fittings 20A, 20B selectively attached to the right and left sides of the main gearbox 10. Each stub tube clamp fitting 20 may further comprise a front half 22 selectively joined to a rear half 24. As shown in the embodiment depicted in FIG. 1B, the rear half 24 is selectively attached to the rear section of the main gearbox 10*b* by means of bolt fasteners and the front half 22 is attached to the rear half 24 by means of various hinged and draw fasteners means. Thus, the front half 22 of the stub tube clamp fitting 20 can either be removed completely or pivoted out of the way so that the flexible lance 125 can be placed laterally into the roller assemblies 40 of the tractor drive device 100. This allows much greater flexibility in positioning the flexible lance 125 into the roller assemblies 40 of the tractor drive device 100. Moreover, a flexible lance 125 pre-fitted with a tool having a diameter larger than the entrance diameter of the stub tube clamp fitting 20 to be easily inserted laterally into the roller assemblies 40 of the tractor drive device 100.

The first embodiment of the tractor drive device 100 may further include a stabilizing tubular frame 2 fixably attached to the main gearbox 10 and a sealed motor housing 4 containing a drive motor 5 connected to a motor brake mechanism 7. In the illustrated embodiment, the drive motor 5 is a bidirectional electric motor. The drive motor 5 can alternatively be a hydraulic or pneumatic motor; however, electric motors are usually preferred. The drive motor 5 and motor brake mechanism 7 are enclosed within a sealed motor housing 4 to prevent ambient air and foreign matter from contaminating the drive motor 5. Indeed, the sealed motor housing 4 may be pressurized with an inert gas (e.g., nitrogen) to protect the electrical components from the incursion of moisture or explosive or corrosive gases. The sealed motor housing 4 may also include a hermetically sealable access point 6 for connecting electrical and control cords to the drive motor 5.

The first embodiment of the tractor drive device 100 of the present invention may also include a remote console connected via the sealable access point 6 to supply power (e.g., electrical, pneumatic, hydraulic) and control the overall system. In addition, a compact battery pack connected via the sealable access point 6 may be used to power the device 100. Such a remote console enables operation of the tractor drive device 100 from a safe distance, typically 10 meters or more from the location of the pipe and device 100. Such a remote console may include directional control (forward and reverse) and a control lever for remotely shutting off the supply of high-pressure water to the hose or flexible lance 125. Such a remote console may also include computerized control to automate repetitive tasks easily. Such a remote console may be compact, to be worn around a user's neck, or may be fastened to a floor support or other structure. A suitable lance hose take-up drum or reel may also be provided to feed out, take in and restore lance hose 125.

The output shaft of the drive motor 5 is coupled to the input of the motor brake mechanism 7, which in turn connects, via its output shaft to a reduction gearbox 8. The reduction gearbox 8 provides a reduction ratio suitable for the task involved, and may, for example, be 5:1, 10:1 or about 20:1 in order to provide appropriate torque to the roller mechanisms for operation of the tractor drive device 100 to suitably propel a flexible lance 125 into and out of the pipe. In the illustrated first embodiment, the reduction gearbox 8 is a 90° gearbox in order to enhance the overall compactness and stability of the tractor drive device 100. However, it is understood that in other embodiments the orientation of the drive motor 5, motor brake mechanism 7 and reduction gearbox 8 could be inline or at any acute angle from the embodiment illustrated.

Figure 2B:
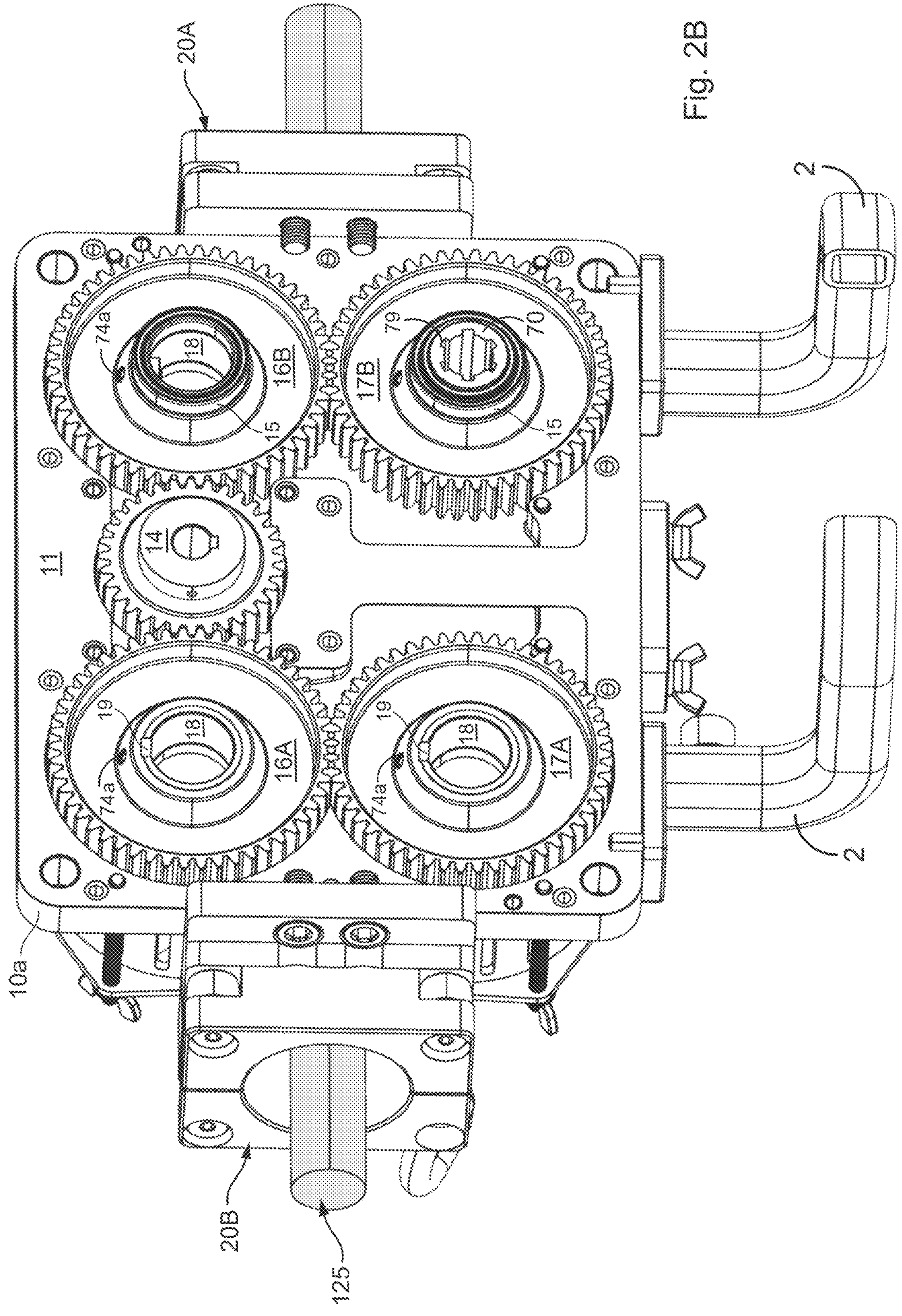
FIG. 2B is a partial cut-away, rear perspective view of the tractor device shown in FIG. 2A.

The reduction gearbox 8 includes a mounting plate that is fixably attached and sealed to the main gearbox 10 and its output shaft 9 is coupled to a pinion drive gear 14 contained within the main gearbox 10. As shown in FIGS. 1B and 2B, in addition to the pinion drive gear 14, the gearworks contained within the main gearbox 10 includes four gears arranged in a fixed configuration. The rotating pinion drive gear 14 drives the gearworks enclosed within the main gearbox 10. The main gearbox 10 comprises a front half or section 10*a* and a matching back half or section 10*b*. The main gearbox 10 contains the gearworks within a void or open space 12 formed within each gearbox section 10*a*, 10*b*. A gasket 11 configured about the periphery of the gearbox sections seals the void or open space 12 within the joined main gearbox 10.

The main walls 10*c*, 10*d* of gearbox sections 10*a*, 10*b*, respectively, include four pairs of co-axial matching apertures 28. Each aperture 28 includes a co-aligned mount on the interior surface of the gearbox for receiving a co-axial ball bearing race 15 (e.g., ball bearing). The gearworks comprises four gears sandwiched between the interior surfaces of the main wall 10*c*, 10*d* of gearbox sections 10*a*, 10*b*, respectively, with each gear configured in a fixed co-axial alignment with one of the four co-axial pairs of apertures 28 and their respective ball bearing race 15.

The gearbox sections 10*a*, 10*b* may be made of a light metal plate material such as aluminum. Optionally, other materials such as a steel, stainless steel, structural plastic, carbon fiber or fiberglass plate material having the requisite structural strength and rigidity could be used either in whole or composite construction. For example, the gearbox sections 10*a*, 10*b* may be made of machined aluminum plate while stub tube clamp fittings 20A, 20B, tubular frame 2 and sealed motor housing 4 could be made of a steel.

The four main gears in the gearworks are configured to rotate in such a way that the four attached or connected roller assemblies rotate in a coordinated manner to either advance or retract the flexible lance 125 through the tractor drive device 100. For example, the upper drive gears 16A, 16B are directly driven by the pinion drive gear 14, while the upper drive gears 16A, 16B, in turn, drive the lower driven gears 17A, 17B. The upper drive gears 16A, 16B and the lower driven gears 17A, 17B are of equal diameter. Thus, when the pinion drive gear 14 rotates in a clockwise (CW) direction it causes both upper drive gears 16A, 16B rotate in a counterclockwise (CCW) direction, while the lower driven gears 17A, 17B both rotate in a clockwise (CW) direction. Conversely, when the pinion drive gear 14 rotates in a counter-clockwise (CCW) direction both upper drive gears 16A, 16B rotate in a clockwise (CW) direction, while the lower driven gears 17A, 17B both rotate in a counter-clockwise (CCW) direction.

Figure 5A:
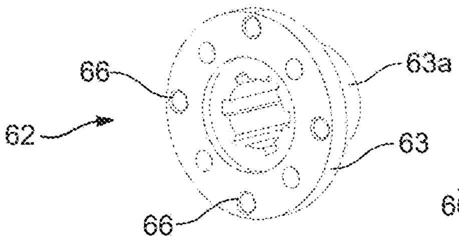
FIG. 5A is a front perspective view of the quick release gearbox hub.
Figure 5B:
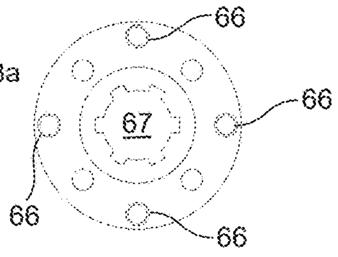
FIG. 5B is front elevation view thereof.
Figure 5C:
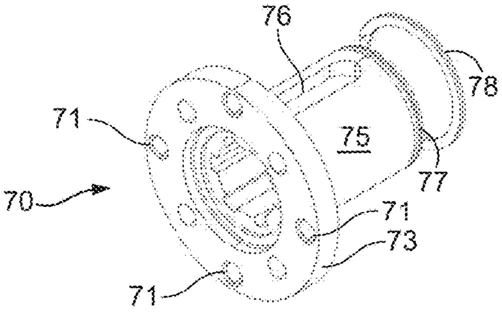
FIG. 5C is a front perspective view of the main gearbox hub assembly.
Figure 5D:
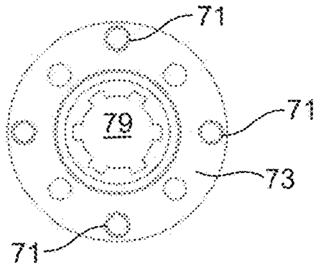
FIG. 5D is a front elevation view thereof.
Figure 5E:
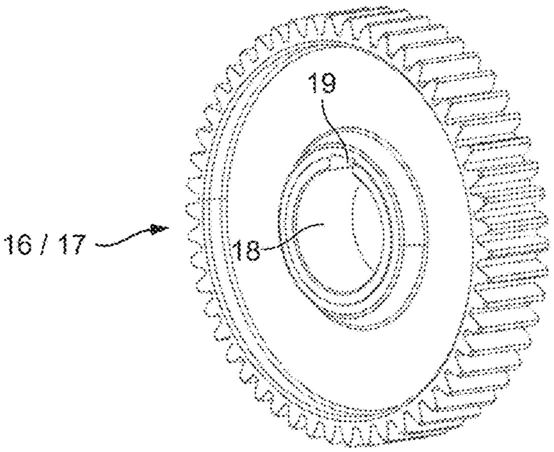
FIG. 5E is a front perspective view of a main gearbox gear.
Figure 5F:
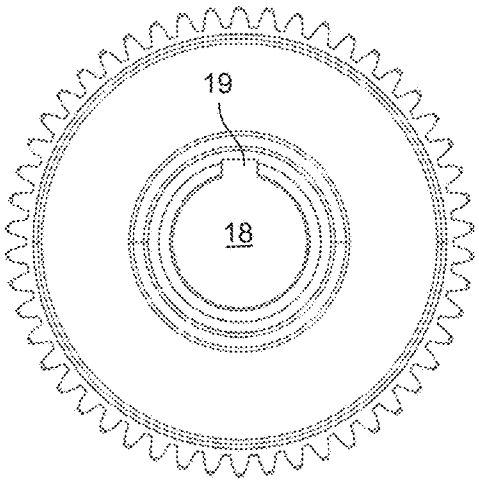
FIG. 5F is a front elevation view thereof.

With reference to FIGS. 2B and 5E-F, the upper and lower gears 16, 17 in the main gearbox 10 are of equal diameter. Each gear 16, 17 includes a smooth central aperture 18 having an internal parallel keyway (i.e., keyjoint) 19 formed therein. A threaded set screw hole is configured above the keyjoint 19 for securing a key 72 within the internal parallel keyway 19 and into a recess 76 formed in a main gearbox hub 70. As shown in FIG. 2B, the first upper drive gear 16A and the first lower driven gear 17A each illustrate only the gears themselves. In contrast, the second upper drive gear 16B is depicted with a co-axial ball bearing race element 15 properly configured in relation to the second upper drive gear 16B, and the second lower driven gear 17B is depicted with a co-axial bearing element 12 and the main gearbox hub 70 properly configured in relation to the second lower driven gear 17B.

Each of the upper and lower gears 16, 17 in the first embodiment of the tractor drive device 100 is used to drive a separate adjustable preload mechanism 50 and its selectively attached roller assembly 40 to advance and retract the flexible lance 125 longitudinally along its length through the tractor drive device 100. With reference now to FIGS. 4A-4D, an embodiment of the roller assembly 40 and adjustable preload mechanism 50 of the first embodiment of the tractor drive device 100 of the present invention is depicted. Each roller assembly 40 comprises a first or main gearbox hub 70, a first or inboard/rear roller half 64, a second or quick-release gearbox hub 62, a second or outboard/front roller half 60, and a twist knob 80 and bushing 82. The roller assembly 40 may further include a retention cable 84 having wire crimps 83, 85 on opposing ends and a biasing element 86 therebetween, and an extended cable bushing 88.

With additional reference to FIGS. 5C-5D, the first or main gearbox hub 70 includes a larger diameter hub portion 73 and a longer, but smaller diameter body portion 75. The body portion 75 of the main gearbox hub 70 is designed to be inserted into its respective aperture 28 in the front section 10*a* of the main gearbox 10, through its respective first or front ball bearing race element 15, through the smooth central aperture 18 of its respective gear 16 or 17, and through its respective second or rear ball bearing element 15 and on through its respective co-axial aperture 28 in the rear section 10*b* of the main gearbox 10. The main gearbox hub 70 may further include a spiral retaining ring 78 secured in a circumferential groove 77 formed in the body portion 75 of the main gearbox hub 70 for maintaining its proper alignment within the main gearbox 10.

The main gearbox hub 70 is fixably attached to its respective gear 16 or 17 by means of a mechanical coupling. The body portion 75 of the main gearbox hub 70 includes a recess 76 formed therein and configured to receive a key 72 affixed in the internal parallel keyway (i.e., keyjoint) 19 of the smooth central aperture 18 of its respective gear 16 or 17. The main gearbox hub 70 is designed to rotate when its respective gear 16 or 17 rotates. However, the hub portion 73 portion of the main gearbox hub 70 is designed so that it does not make contact with the exterior surface of the front half or section 10*a* of the main gearbox 10. The main gearbox hub 70 further includes a splined bore 79 have a cross-section complimentary to that of the splined shaft or spindle 51 of its respective adjustable preload mechanism 50. Thus, the main gearbox hub 70 and splined shaft or spindle 51 rotate in unison as its respective gear 16 or 17 rotates.

The inboard or rear roller half 64 of the first embodiment of the tractor drive device 100 is selectively attached to the hub portion 73 of the main gearbox hub 70 by means of screw fasteners 68 (See FIG. 6) attached to threaded holes 71 in the hub portion 73 portion of the main gearbox hub 70. The inboard or rear roller half 64 also includes a central aperture 64*b* which allows the splined shaft or spindle 51 to easily pass through. The inboard or rear roller half 64 may further include a circular sealing device 65 configured on its back or rear-facing side closest to the exterior surface of the front half or section 10*a* of the main gearbox 10. The sealing device 65 restricts the flow of any contaminants into and out of the aperture 28 in the front section 10*a* of the main gearbox 10.

The second or quick-release gearbox hub 62 of the first embodiment of the tractor drive device 100 includes larger diameter hub portion 63 and a longer, but smaller diameter body portion 63*a*. The body portion 63*a* of the quick-release gearbox hub 62 is designed to have a smaller outer diameter than the internal diameter of the central aperture 64*b* of the inboard or rear roller half 64. As shown in FIGS. 5A-5B, the second or quick-release gearbox hub 62 further includes a splined bore 67 have a cross-section complimentary to that of the splined shaft or spindle 51 of its respective adjustable preload mechanism 50. Thus, the quick-release gearbox hub 62 and splined shaft or spindle 51 rotate in unison as its respective gear 16 or 17 rotates.

Figure 8A:
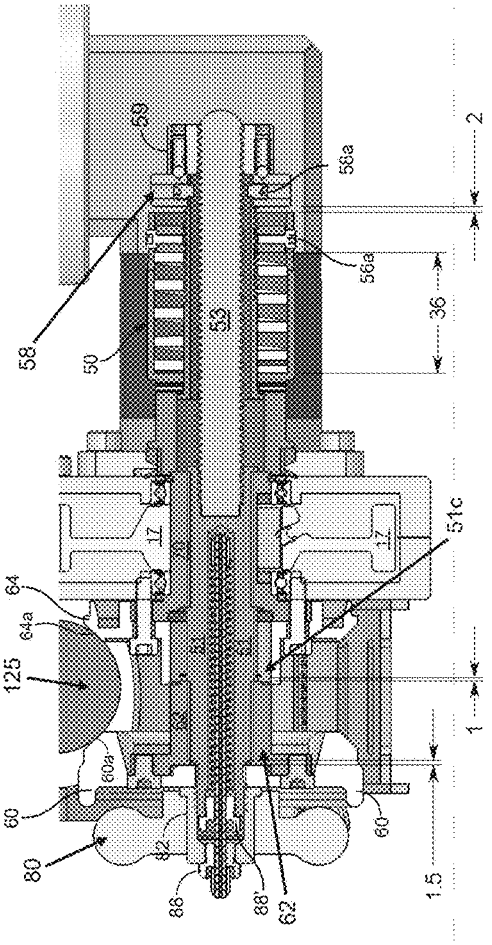
FIGS. 8A and 8B are partial cross-sectional side views a single adjustable preload mechanism and the split-sheave roller hose clamp assembly demonstrating the operation of the adjustable preload mechanism in tightening the split-sheave roller hose clamp assembly about a flexible lance or hose.
Figure 8B:
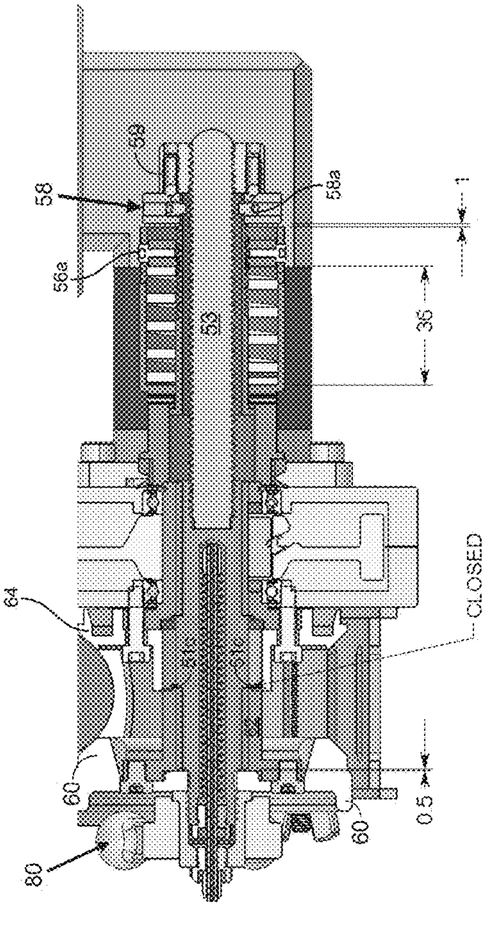

The quick-release gearbox hub 62 of the first embodiment of the tractor drive device 100 also includes a means for selectively connecting with the second or outboard/front roller half 60. For example, in one embodiment the quick-release gearbox hub 62 includes alignment fasteners or screws 61 fixably attached to threaded holes in the hub portion 63 of the quick-release gearbox hub 62. The alignment fasteners or screws 61 stand proud of the hub portion 63 of the quick-release gearbox hub 62 so as to interlock or engage with an aperture 61*a* formed in the second or outboard/front roller half 60. In the embodiment depicted in the Figures, the second or outboard/front roller half 60 includes a cruciform aperture 61*a* formed therein and an outboard planar face for receiving the rear face of the twist knob 80 and bushing 82. With additional reference to FIGS. 6 and 8A-B, the bushing 82 includes a threaded bore for threading onto the distal threaded tip 51*a* of the splined shaft or spindle 51 of its respective adjustable preload mechanism 50. The twist knob 80 may include a complementary or interlocking hole for receiving bushing 82 either with a friction or interlocking fit. The distal end of the bushing may further include an extended cable bushing 88 for receiving a retention cable 84 having wire crimps 83, 85 on opposing ends and a biasing element 86. The retention cable 84 is used to conveniently retain the twist knob 80 and other roller assembly 40 components when making adjustments to the system during operation.

Figure 6:
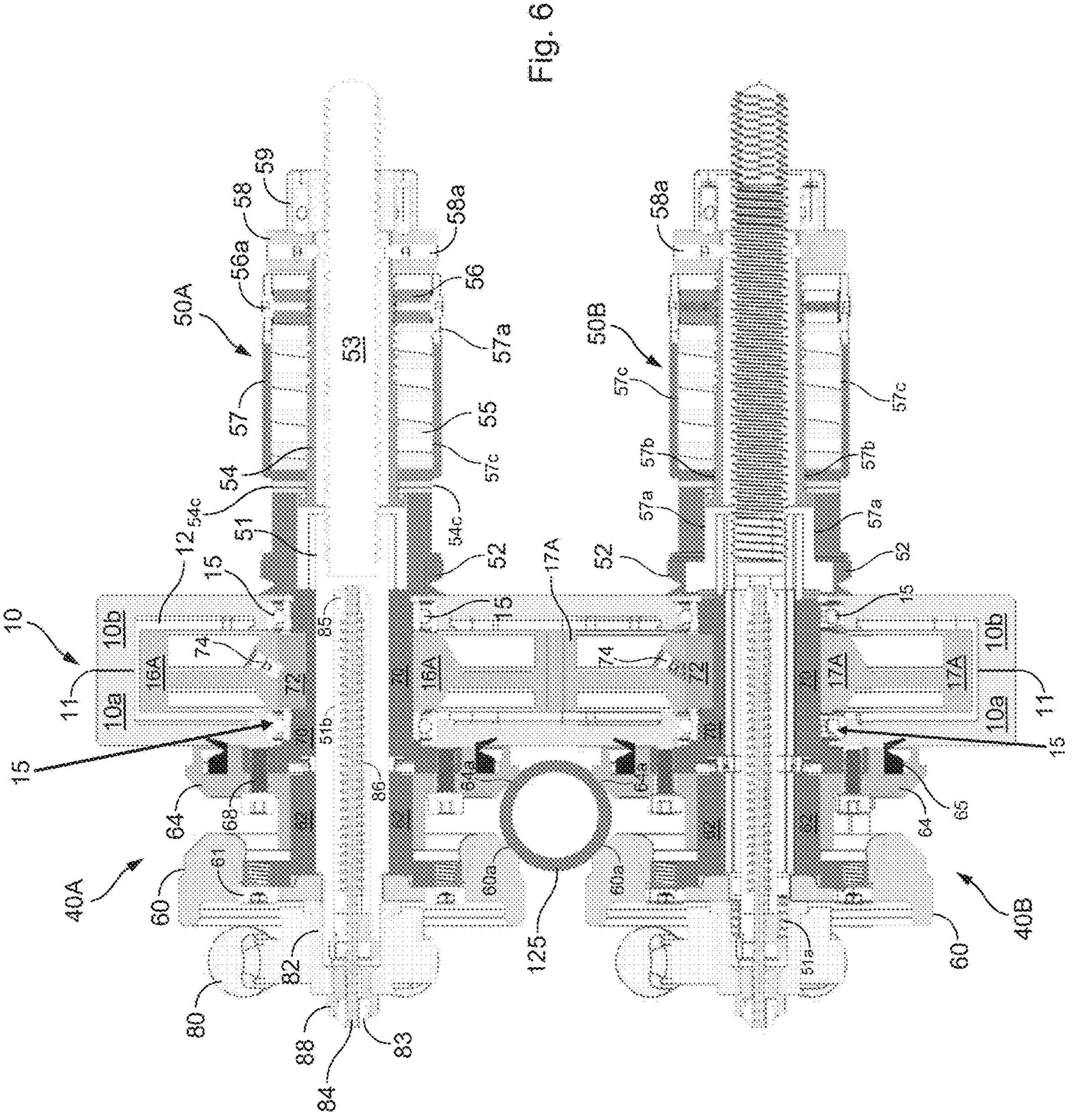
FIG. 6 is a cross-sectional view taken along section A-A shown in FIG. 3A.

With reference again to FIGS. 4A-4D, an embodiment of the adjustable preload mechanism 50 of the first embodiment of the tractor drive device 100 of the present invention is depicted. Each adjustable preload mechanism 50 comprises a splined shaft or spindle 51 having a threaded tip 51*a* on its distal end. The splined shaft or spindle 51 further includes a smooth cylindrical bore 51*b* in its front section and a threaded bore in its rear section. The smooth cylindrical bore 51_b_ in the splined shaft or spindle 51 is used to house the retention cable 84 and wire crimp 83, 85 when the roller assembly 40 is properly assembled and tightened onto the splined shaft or spindle 51. With further reference to FIG. 6, the retention cable 84, biasing element 86 and wire crimp 85 are housed in the smooth cylindrical bore 51_b_ when the roller assembly 40 is properly assembled and tightened onto the splined shaft or spindle 51. A wire crimp 83 on the opposing end of the captured in an extended cable bushing 88 configured in the front end of the bushing 82. A similar extended cable bushing 88' is attached within the opening of the smooth cylindrical bore 51_b_ on threaded tip 51_a_ to capture the second wire crimp 85 when the roller assembly 40 is loosened. For example, in one embodiment the threaded tip 51_a_ has screw threads formed on its exterior surface to receive the threaded bore of bushing 82 and screw threads formed just inside interior bore cylindrical bore 51_b_ for receiving and coupling with extended cable bushing 88'.

The splined shaft or spindle 51 further includes a snap ring 51_c_ configured within a circumferential groove 51_d_ formed within the surface of the splined shaft or spindle 51. As will be explained in greater detail, the snap ring 51_c_ is used to properly position the roller assembly 40 and adjustable preload mechanism 50 when tightened.

The splined shaft or spindle 51 further comprises a threaded bore in its rear section for receiving a coaxial threaded rod 53. The threaded rod 53 is captured co-axially within a stationary preload tubular sleeve 54 housed within a tubular main housing 57. The stationary preload tubular sleeve 54 includes a smooth interior bore and features a hub portion 54_a_ on its front section. The preload tubular sleeve 54 also includes an exterior threaded section 54_b_ followed by a smooth exterior section 54_d_ towards its rear. The exterior threaded section 54_b_ of the stationary preload tubular sleeve 54 is designed to rotatively couple with a preload washer 56 contained within tubular main housing 57. Similarly, the smooth exterior section 54_d_ of stationary preload tubular sleeve 54 is designed to connect within a smooth bore of a preload sleeve wheel 58 configured just outside of the rear of the tubular main housing 57.

The front of the tubular main housing 57 includes a rotary seal 52 for sealing its respective aperture 28 formed through the back wall 10_c_ of the gearbox back section 10_d_. The tubular main housing 57 includes two sections having different diameter tubular bores within the housing 57 and include an entrance section 57_a_ and a spring capture section 57_c_ (FIG. 6). Between these two sections is a necking/transition passageway 57_b_ that connects the entrance section 57_a_ to the spring capture section 57_c_. The entrance section 57_a_ has a bore sufficient to receive the rear or aft section of the splined shaft or spindle 51 without binding. The necking/transition passageway 57_b_ has a bore diameter sufficient to receive the stationary preload tubular sleeve 54 and coaxially aligned threaded rod 53 captured within. However, the diameter of the hub portion 54_a_ of the stationary preload tubular sleeve 54 is designed to be larger than the bore diameter of the necking/transition passageway 57_b_ such that the hub portion 54_a_ of the stationary preload tubular sleeve 54 is confined to the entrance section 57_a_ of the tubular main housing 57 while the remainder of the tubular stationary preload sleeve 54 extends into the spring capture section 57_c_ of the tubular main housing 57. Coiled spring pins 54_c_ inserted through holes formed in the tubular wall of the main housing 57 may be used to secure the stationary preload tubular sleeve 54 within the interior of the main housing 57.

The spring capture section 57_c_ of the tubular main housing 57 has a diameter sufficient to receive the stationary preload tubular sleeve 54 and the coaxially aligned threaded rod 53 captured therein, and a biasing mechanism 55 (e.g., a spring mechanism) configured about the outer periphery of the stationary preload tubular sleeve 54. The biasing mechanism 55 is contained within the spring capture section 57_c_ of the tubular main housing 57 by a preload washer 56 rotatively coupled to the exterior threaded section 54_b_ of the stationary preload tubular sleeve 54. The preload washer 56 includes at least one extended tip screw 56_a_ affixed to its exterior peripheral surface for indicating its position within an incremental adjustment window 57_d_ on the tubular main housing 57.

The smooth exterior section 54_d_ of the stationary preload tubular sleeve 54 is fixably connected to a preload sleeve wheel 58 that is configured just outside of the rear of the tubular main housing 57. The preload sleeve wheel 58 has a smooth bore designed to receive and attach to the smooth exterior section 54_d_ of the stationary preload tubular sleeve 54. In the depicted embodiment, the preload sleeve wheel 58 is fixably attached to the smooth exterior section 54_d_ of the stationary preload tubular sleeve 54 by means of at least or more set screws 58_a_.

Finally, a wheel spacing knob 59 is rotatively coupled to the aft or distal end of the threaded rod 53 but not to the stationary preload tubular sleeve 54. Additionally, the wheel spacing knob 59 is attached to the preload sleeve wheel 58 such that when the wheel spacing knob 59 is rotated the preload sleeve wheel 58 rotates concurrently in the same direction. In one embodiment, the wheel spacing knob 59 is selectively attached via pins 59_a_ inserted into co-aligned holes drilled into the wheel spacing knob 59 and the preload sleeve wheel 58. The threads on the threaded rod 53 and wheel spacing knob 59 are in one direction, while the threads on exterior surface of the stationary preload tubular sleeve 54 and on the threaded bore of the preload washer 56 are in a different direction. For example, in the depicted embodiment the threaded rod 53 and wheel spacing knob 59 have right-hand threads, the threads on exterior surface of the stationary preload tubular sleeve 54 and in the threaded bore of the preload washer 56 are left-hand threads.

The wheel spacing knob 59 and connected preload sleeve wheel 58 are used to adjust the amount of compression on the biasing mechanism 55 within the spring capture section 57_c_ of the tubular main housing 57. Since the preload sleeve wheel 58 is fixed to the stationary preload tubular sleeve 54, turning the wheel spacing knob 59 and connected preload sleeve wheel 58 in one direction causes the stationary preload tubular sleeve 54 to rotate in the same direction. This, in turn, causes the preload washer 56 to compress or expand the biasing mechanism 55 within the spring capture section 57_c_ of the tubular main housing 57. The extended tip screw 56_a_ affixed to the preload washer 56 indicates the position of the preload washer 56 within an incremental adjustment window 57_d_ on the tubular main housing 57. The proper position of the extended tip screw 56_a_ within the incremental adjustment window 57_d_ is determined by the size of the split-sheave roller assembly 40 used and the size of the hose or flexible lance 125.

With reference now to FIGS. 7A-B and 8A-B, the wheel spacing knob 59 is used to adjust the position or length of the spline shaft or spindle 51 which determines the distance or gap between the inboard or rear roller half 64 and the outboard/front roller half 60 of the split-sheave roller assembly 40. The wheel spacing knob 59 is then rotated/tightened until the opposing contact faces 60_a_, 64_a_ of the split sheeve roller assembly 40 make contact with hose or flexible lance 125. The wheel spacing knob 59 is then rotated further to adjust the gap between the preload sleeve wheel 58 and the rear of the tubular main housing 57. In the depicted embodiment, the distance is approximately 1-2 mm. As shown in the Figures, this distance corresponds to the distance between the rear or aft end of the second or quick-release gearbox hub 62 and the snap ring 51*c* configured within a circumferential groove 51*d* formed within the surface of the splined shaft or spindle 51. The twist knob 80 and bushing 82 of the split-sheave roller assembly 40 is then fully tightened so that the rear or aft end of the quick-release gearbox hub 62 bottoms out on the snap ring 51*c*. By closing the gap between the rear or aft end of the quick-release gearbox hub 62 and the snap ring 51*c*, the compressive force in the a biasing mechanism 55 is transferred to the outboard/front roller half 60 of the split-sheave roller assembly 40 exerting a clamping force on the hose or flexible lance 125 thereby clamping the hose or flexible lance 125 between the opposing contact faces 60*a*, 64*a* of the split-sheeve roller assembly 40.

The ability of the split-sheave roller assembly 40 to quickly clamp and release the flexible lance or hose 125 greatly enhances the utility, safety and effectiveness of the tractor drive device 100 of the present invention. Moreover, the arrangement of the gearworks in the main gearbox 10 greatly simplifies the operation of the subject tractor drive device 100. All four split-sheave roller assemblies 40 are geared together advancing and retracting the flexible lance or hose 125 in the same direction, at the same speed and driven by a single drive motor 5. Moreover, the flexible lance or hose 125 can be fed either longitudinally (i.e., inline with its length) into the roller assemblies 40 of the tractor drive device 100 or laterally by temporarily removing or pivoting the outboard/front roller half 60 out of the way of two of the top or bottom split-sheave roller assemblies 40. Moreover, a flexible lance or hose 125 pre-fitted with a tool having a diameter larger than the entrance diameter of the stub tube clamp fitting 20 to be easily inserted laterally into the roller assemblies 40 of the tractor drive device 100 when the front half 22 of the stub tube clamp fitting 20 is either be removed completely or pivoted out of the way.

Figure 3A:
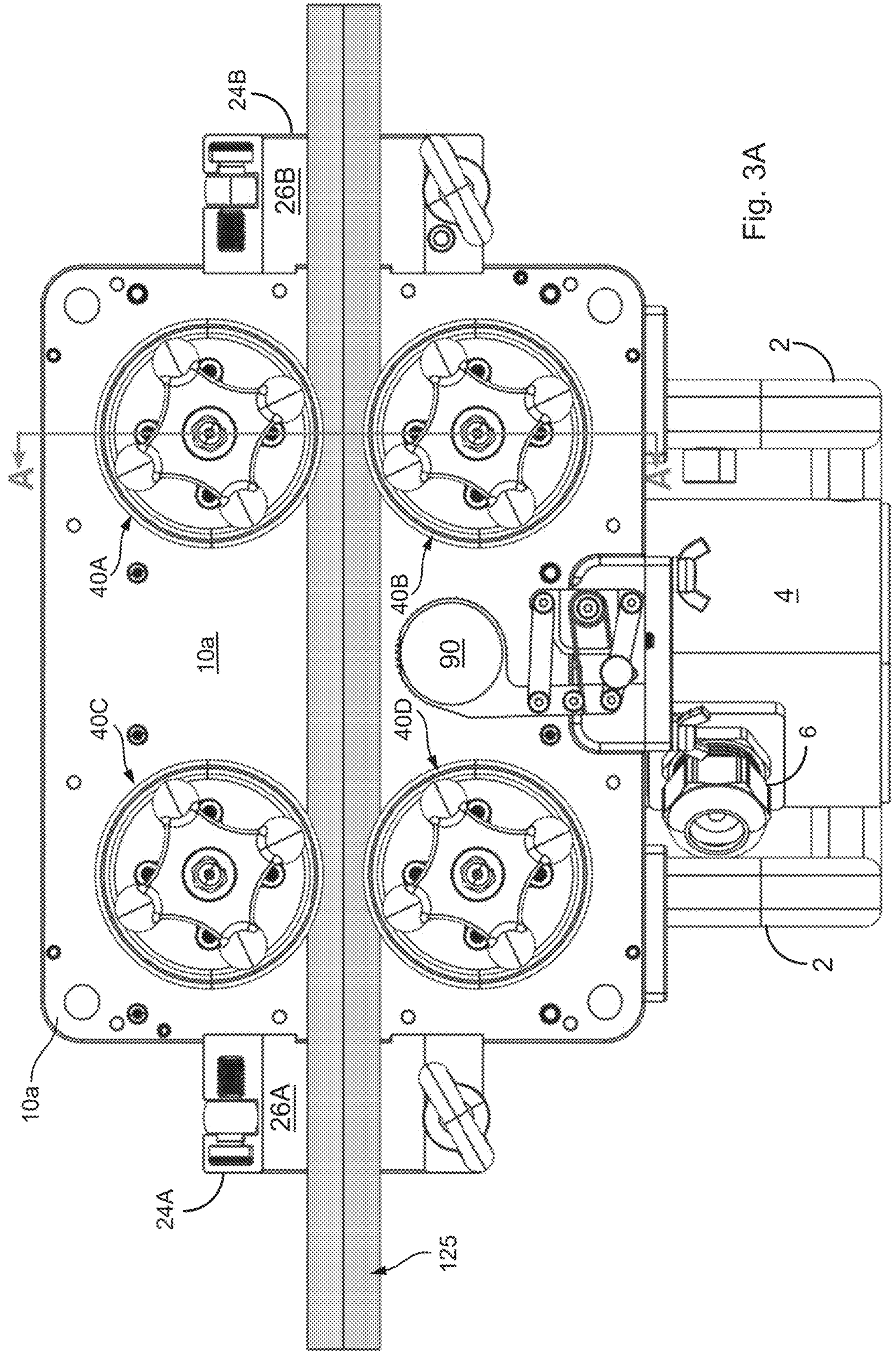
FIG. 3A is a front elevation view of the tractor device shown in FIG. 1A.
Figure 3B:
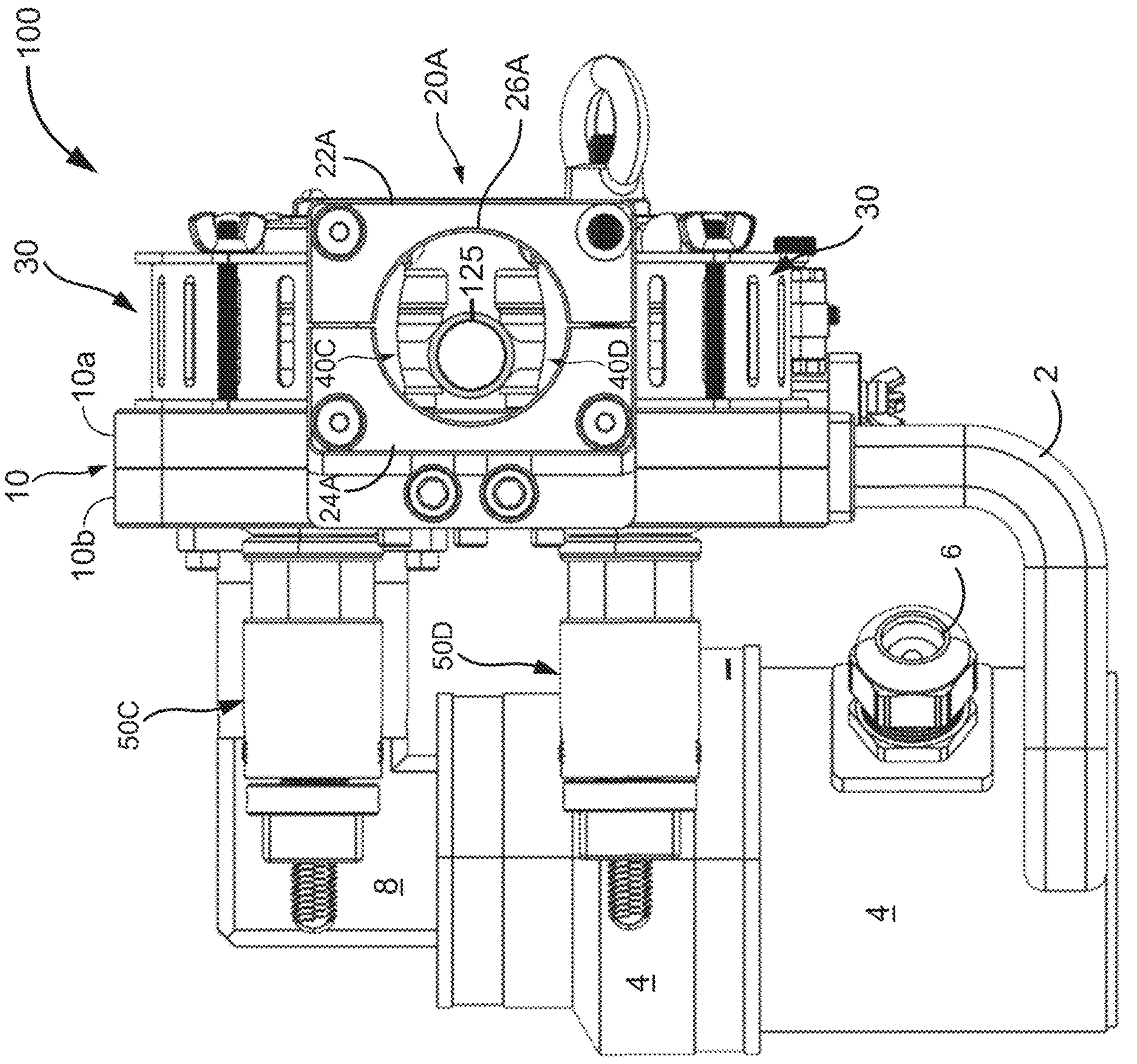
FIG. 3B is a left-side elevation view of the tractor device shown in FIG. 1A.
Figure 3C:
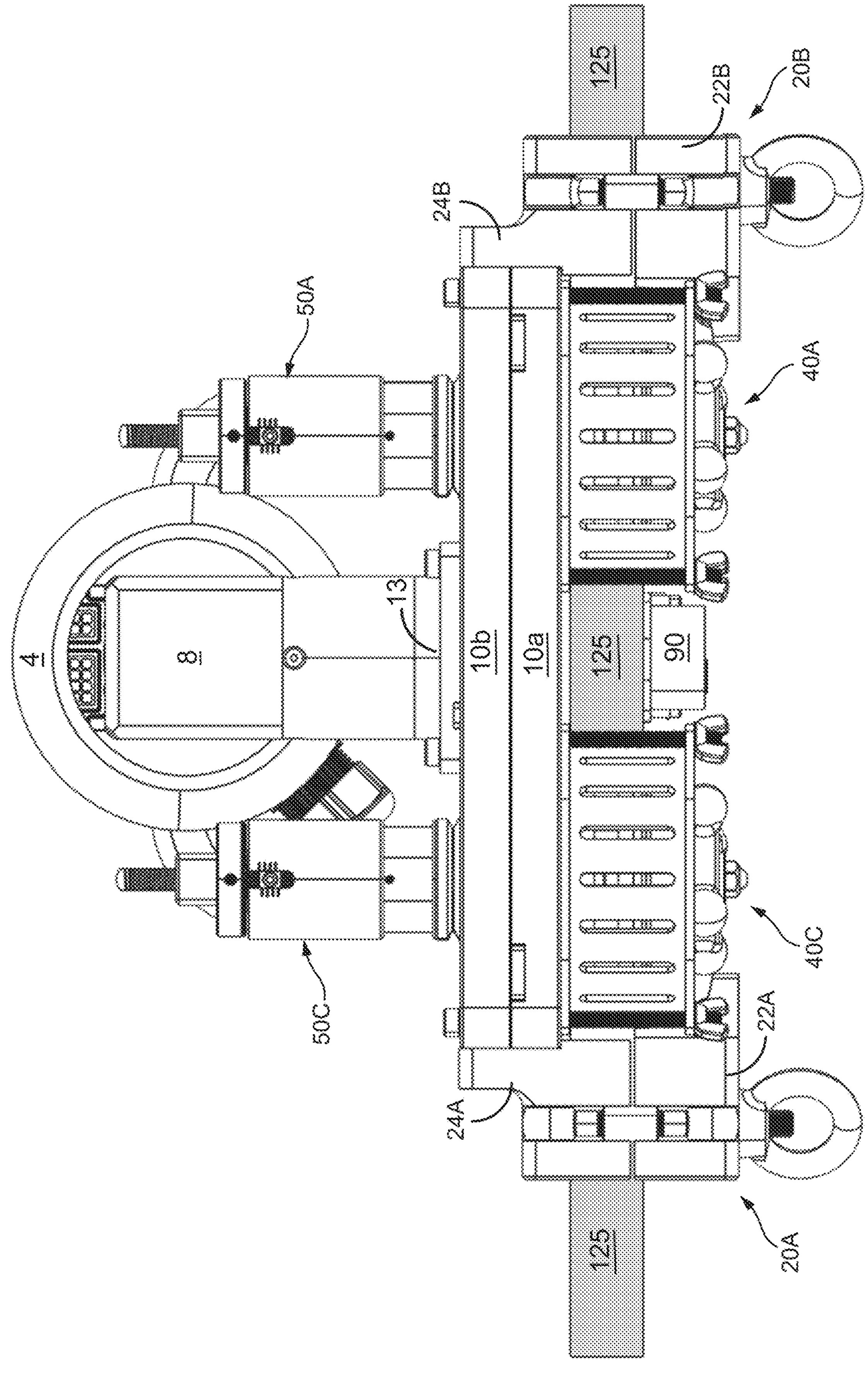
FIG. 3C is a top plan view of the tractor device shown in FIG. 1A.
Figure 4C:
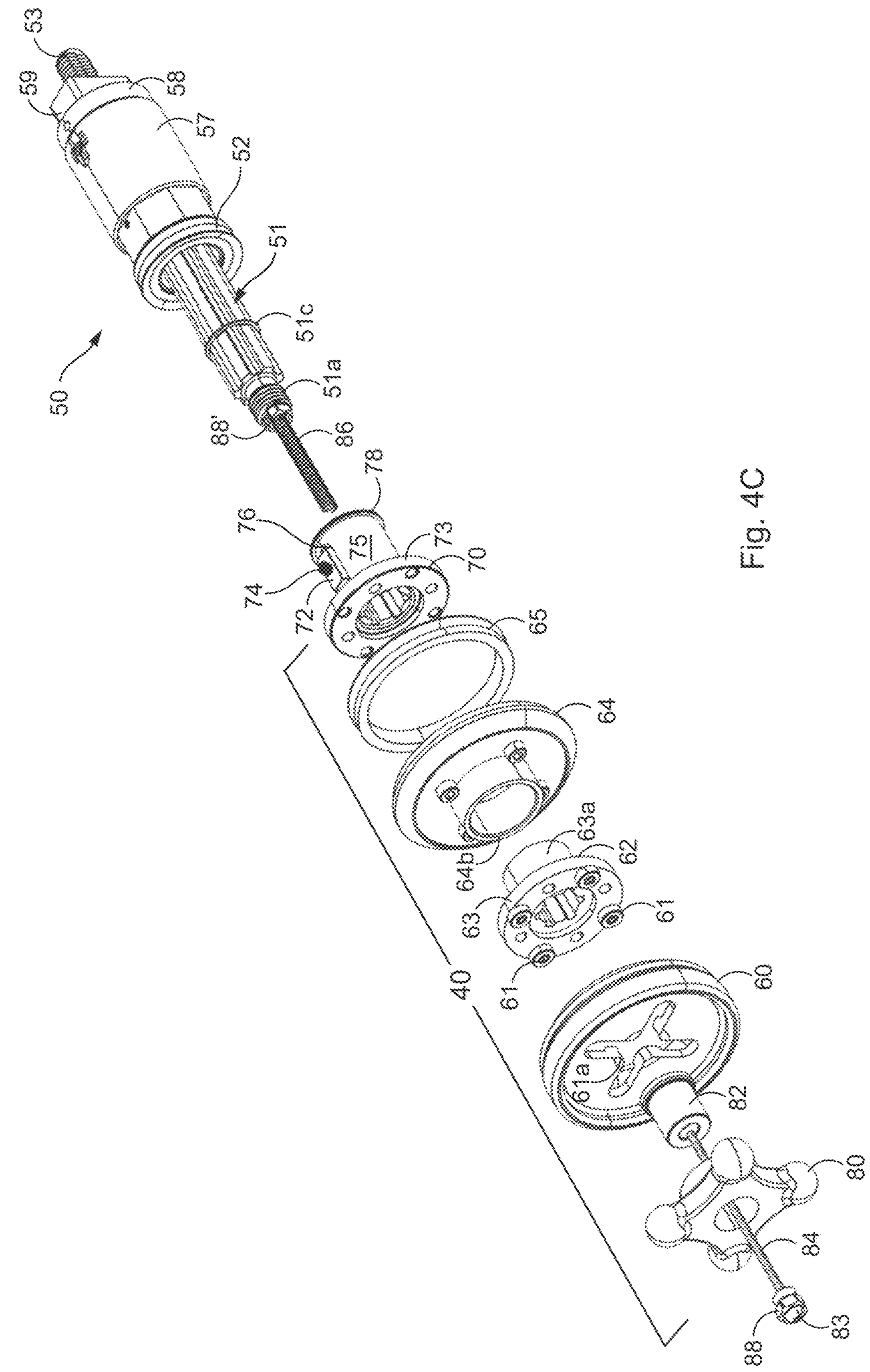
FIG. 4C is a partially exploded perspective view thereof.
Figure 4D:
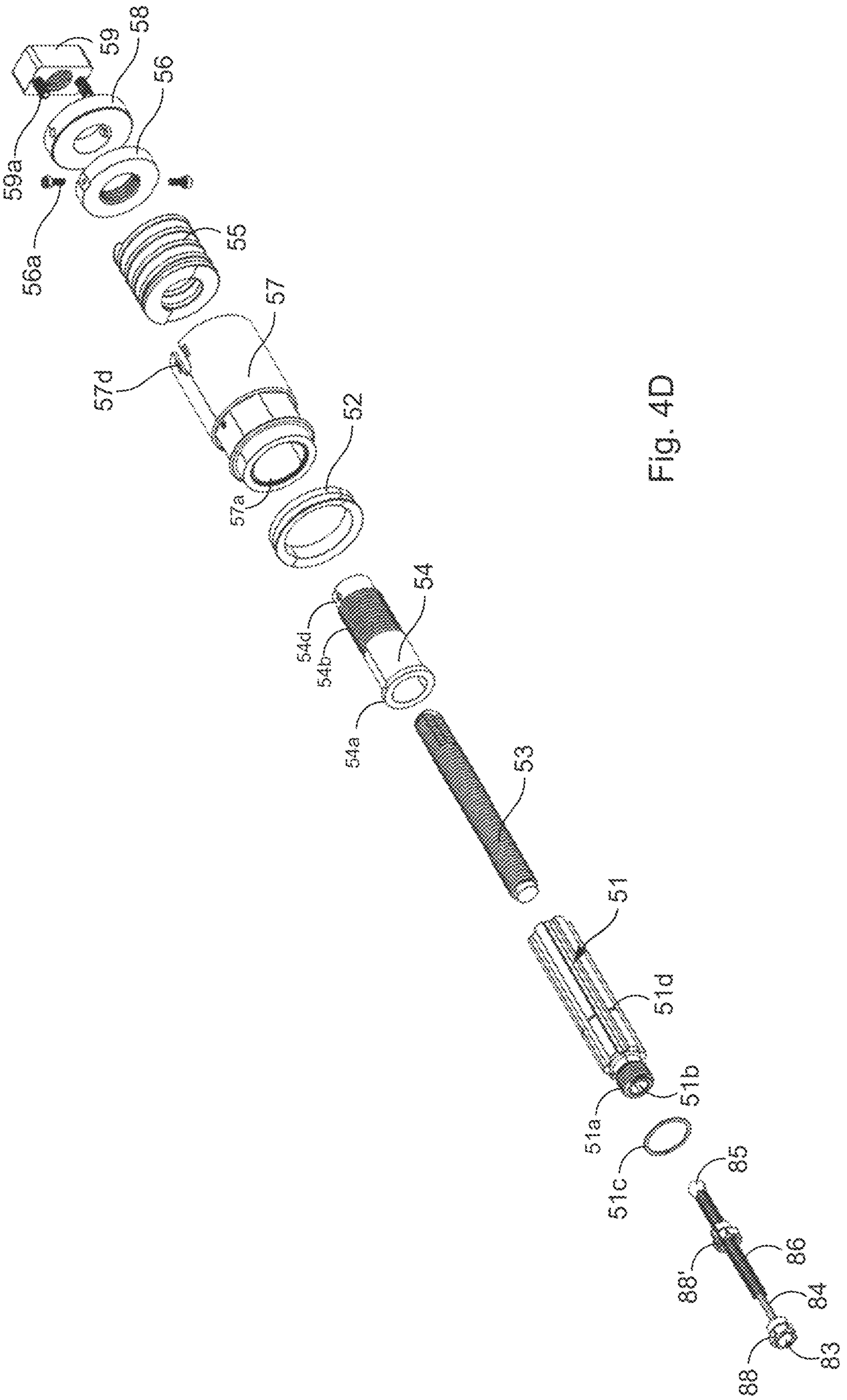
FIG. 4D is an exploded perspective view preload shaft mechanism shown in FIG. 4C.

With reference to FIG. 3A, the two sets or pairs of split-sheave roller assemblies 40A/40B, 40C/40D of the first embodiment of the tractor drive device 100 are independent of one another, so that if a coupling on a hose needs to pass through the tractor drive device 100, the flexible lance or hose 125 can be advanced using only a first set of split-sheave roller assemblies 40A/40B with the second set of split-sheave roller assemblies 40C/40D having one or more of their outboard/front roller halves 60 removed or pivoted out of the way allowing the coupling to pass unimpeded through the second set of split-sheave roller assemblies 40C/40D until the coupling is configured between the two sets or pairs of split-sheave roller assemblies (i.e., 40A/40B and 40C/40D). The flexible lance or hose 125 can then be clamped in place by the second set of split-sheave roller assemblies 40C/40D and the first set of split-sheave roller assemblies 40A/40B can have one or more of their outboard/front roller halves 60 removed or pivoted out of the way so that the second set of split-sheave roller assemblies 40C/40D can then advance the flexible lance or hose 125 until the coupling passes the first set of split-sheave roller assemblies 40A/40B whereby the loosened outboard/front roller halves 60 can be tightened and the tractor drive device 100 can resume standard operations with both sets of split-sheave roller assemblies 40A/40B, 40C/40D advancing the flexible lance or hose 125.

Figure 9A:
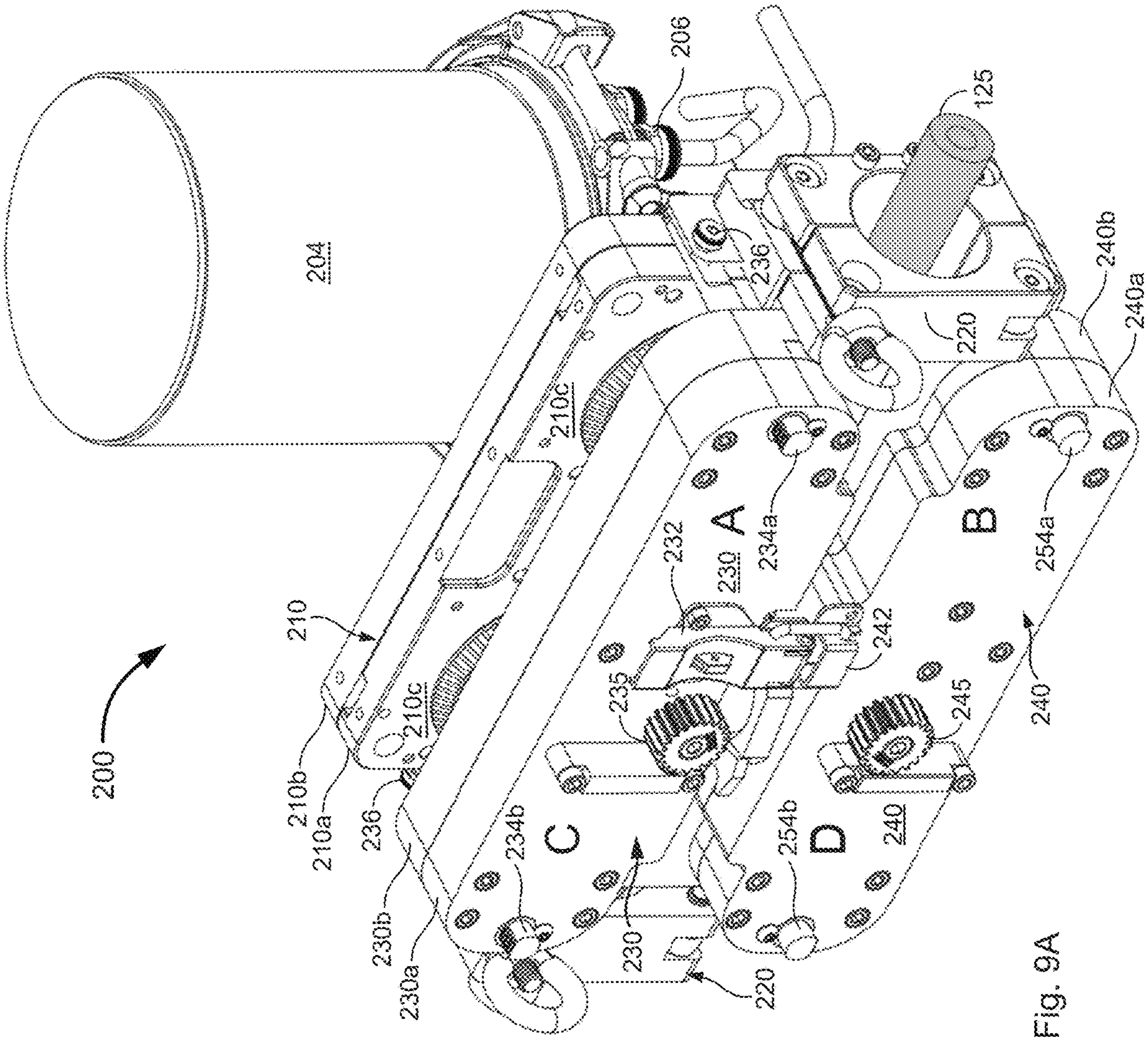
FIG. 9A is a perspective front view of a second embodiment of an exemplary drive mechanism or tractor device in accordance with the present disclosure.
Figure 10A:
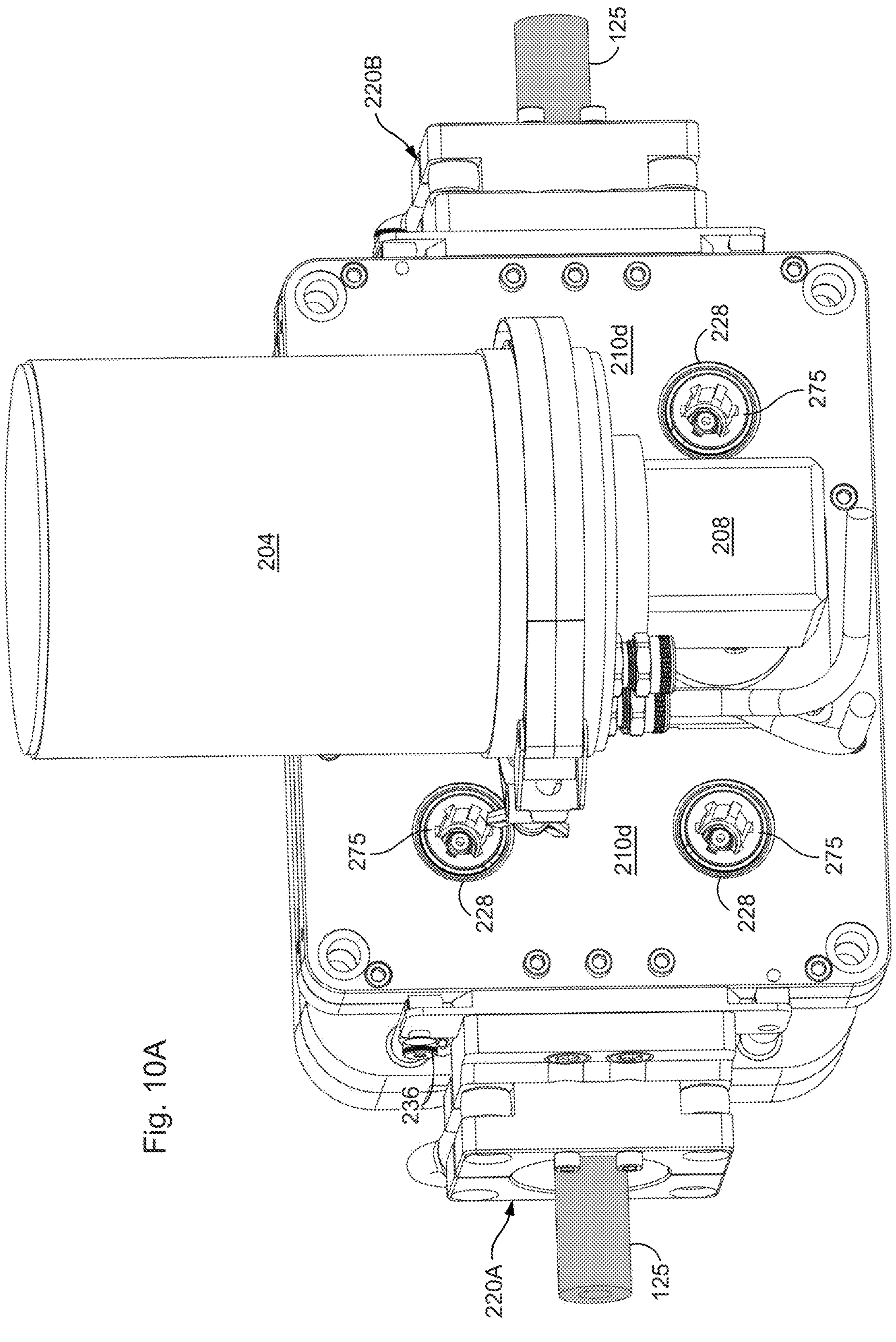
FIG. 10A is a perspective rear view of the tractor device shown in FIG. 9A.

A second embodiment of an exemplary tractor drive device 200 in accordance with the present disclosure is shown in a front perspective view in FIG. 9A. This tractor drive device 200 is shown in a rear perspective view in FIG. 10A. The second embodiment 200 includes a main gearbox 210 very similar to the main gearbox 10 of the first embodiment 100. However, in marked contrast, the second embodiment 200 also includes adjustable and pivotal upper and lower clamp housing units 230, 240 which enhance the simplicity and effectiveness of the tractor drive device 200. For example, to access the flexible lance or hose 125 within the tractor device 200, a user need only unlatch the latching mechanism 232 on the upper clamp housing 230 from its catch 242 on the lower clamp housing 240 and pivot the upper clamp housing 230 up and away from the main gearbox 210. While latching mechanism 232 is depicted as a tension latch, it is understood that there is a wide variety of other latching mechanisms available. Alternatively, the latching mechanism 232 could be configured on the lower clamp housing 240 while the catch could be positioned on the upper clamp housing 230. Regardless, the latching mechanism 232 serves to securely hold the upper and lower clamp housings in position during operation. Additionally, the upper and lower clamp housings 230, 240 each contain an adjustable clamping mechanism 250 that enables an operator or user to properly adjust the lateral distance between the upper and lower clamp housing from the main gearbox.

As with the first embodiment, the second embodiment of tractor device 200 of the present invention may be configured within a pipe cleaning system in much the same manner as the tractor drive device specified in the previously referenced '453 patent depending on the environment surrounding the end of the particular pipe that is to be cleaned. Indeed, the second embodiment of the tractor device 200 of the present invention is also configured to be interchangeable with (i.e., replace/upgrade) the tractor drive device of the pipe cleaning system of the previously referenced '453 patent. Thus, the pipe cleaning system which incorporates the second embodiment of tractor device 200 of the present invention may further include a winch pipe clamp assembly (not shown) that fastens a support tube positioner arm (not shown) to the pipe, a tractor support member (not shown) fastened to the positioner arm (not shown), and a back-out preventer collet block (not shown) fastened to the support member (not shown). The tractor device 200 drives the flexible lance 125 into and out of the pipe to be cleaned.

With reference now to FIGS. 9A-9B, 10A, 11A-11C, 14A-C and 17A-B the second embodiment of the tractor drive device 200 comprises a main gearbox 210 containing a gearworks for driving two sets of adjustable split-sheave roller assemblies 280. Each set or pair of adjustable split-sheave roller assemblies 280 is configured in a fixed vertical arrangement to one another, such that a flexible lance 125 may be clamped between them. Each adjustable split-sheave roller assembly 280 includes two separate roller halves or sheaves 260, 264 for interfacing with or engaging the flexible lance 125. The separate roller halves or sheaves 260, 264 are each selectively attached to a gearbox hub 270 configured in either the main gearbox 210 or in one of the clamp housings 230, 240. The separate roller halves or sheaves 260, 264 are typically constructed of a hard metal with texturing slats 269 formed either into or extending out of the opposing contact faces 260*a*, 264*b* of the separate roller halves or sheaves 260, 264. While in one variant, each opposing contact face may comprise a curved shape complementary to a quarter of the peripheral surface of the flexible lance 125, such a roller half is only suitable for a single diameter flexible lance 125 requiring a separate pair of roller halves or sheaves 260, 264 for each particularly sized flexible lance 125. Thus, in a preferred embodiment, the opposing contact faces 260*a*, 264*b* are beveled at an acute angle to accommodate a wider variety of lance hose diameters by adjusting the lateral distance between the roller halves or sheaves 260, 264. Other embodiments of the roller halves or sheaves 260, 264 may also include urethane or silicone coatings to lessen the damage to the flexible lance or hose 125 while maintaining a firm grip.

Each split-sheave roller assembly 280 engages the surface of the flexible lance 125 at two points about the periphery of the flexible lance 125 to securely hold the flexible lance 125 between an upper and lower roller assemblies 280. (See FIGS. 17A-17B) Typically, the two sets or pairs of roller assemblies 280A/280B, 280C/280D are sufficiently spaced from each other so that a coupling or small tool may be configured on the flexible lance 125 without touching or interfering with either pair of roller assemblies 280. An encoder device 290 may also be configured in the space between the pairs of roller assemblies 280. The encoder device 290 can be configured in an extended position from either the upper or lower clamp housings 230, 240 so as to engage the side of the flexible lance 125 in order to assess the advancement and retraction of the flexible lance 125 through the tractor drive device 200. In addition, the encoder device 290 may comprise or be connected to a computerized sensor for detecting length, speed, and force of the advancement and retraction of the flexible lance 125 through the tractor drive device 200. Such generated data may be further used to control the motor 205 and other system components.

The four roller assemblies 280A-D of the second embodiment of the tractor drive device 200 are contained within and partially covered by the upper and lower clamp housings 230, 240 to prevent foreign objects (e.g., user's hands) from being caught between a roller assembly 280 and the flexible lance 125. While the progress of the flexible lance 125 through the two top roller assemblies 280A, C may be observed through the top of the device 200, the upper and lower clamp housings 230, 240 provide enhanced safety to users.

Figure 9B:
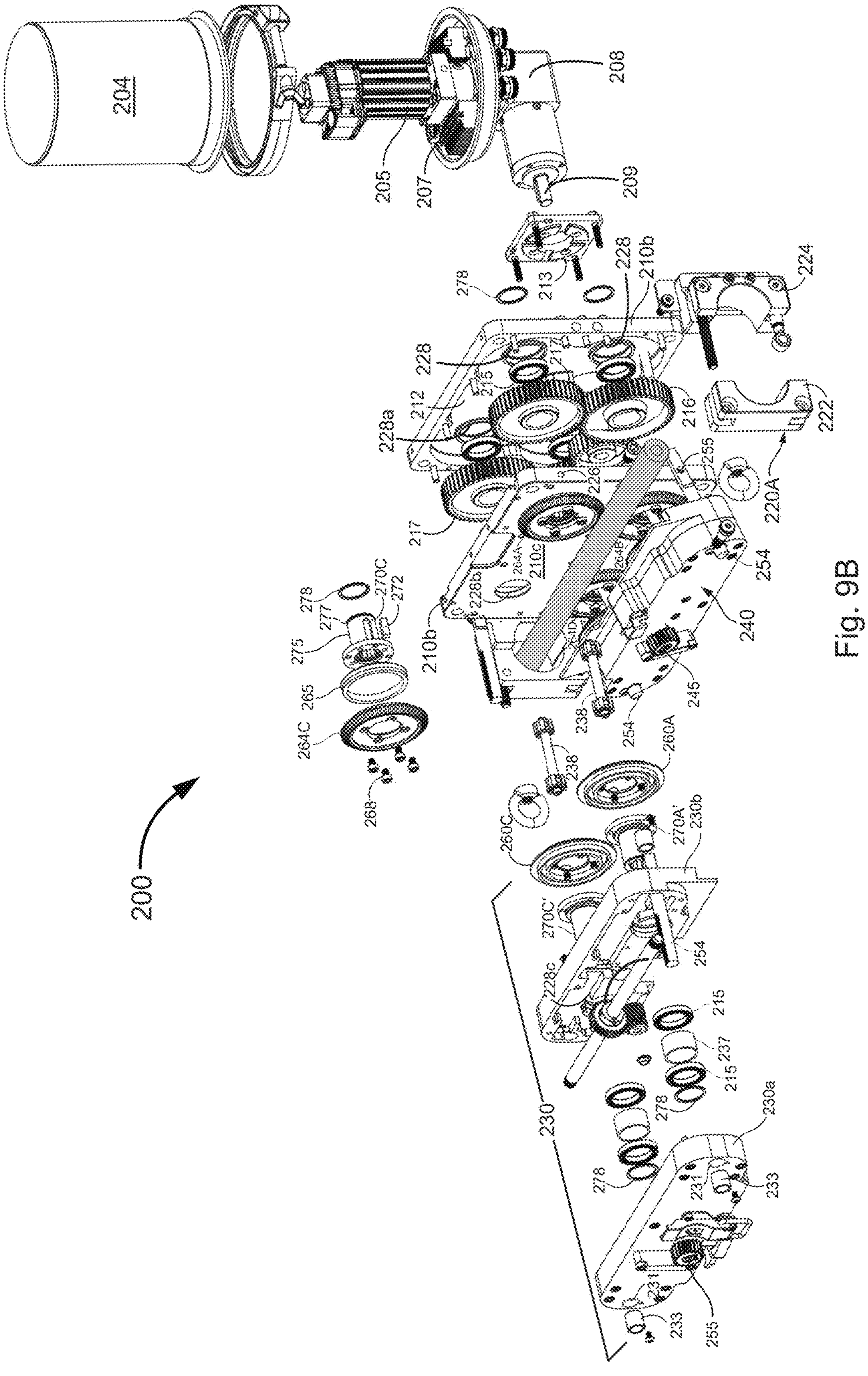
FIG. 9B is an exploded perspective front view of the tractor device shown in FIG. 9A.

The second embodiment of the tractor drive device 200 may further include a stub tube clamp fitting 220A, 220B, as previously described in first embodiment, attached on either or both sides of the main gearbox 210. The stub tube clamp fitting 220 may be used to attach the tractor drive device 200 to a support member and for channeling the flexible lance 125 longitudinally (i.e., inline with its length) into the roller assemblies 280. For example, as depicted in FIG. 9A-B, the tractor drive device 200 may include one or more stub tube clamp fittings 220A, 220B selectively attached to the right and left sides of the main gearbox 210. Each stub tube clamp fitting 220 may further comprise a front half 222 selectively joined to a rear half 224. As shown in the embodiment depicted in FIG. 9B, the rear half 224 is selectively attached to the rear section of the main gearbox 210*b* by means of bolt fasteners and the front half 222 is attached to the rear half 224 by means of various hinged and draw fasteners means. Thus, the front half 222 of the stub tube clamp fitting 220 can either be removed completely or pivoted out of the way so that the flexible lance 125 can be placed laterally into the roller assemblies 280 of the tractor drive device 200. This allows much greater flexibility in positioning the flexible lance 125 into the roller assemblies 240 of the tractor drive device 200. Moreover, a flexible lance 125 pre-fitted with a tool having a diameter larger than the entrance diameter of the stub tube clamp fitting 220 to be easily inserted laterally into the roller assemblies 280 of the tractor drive device 200.

While not depicted in the Figures, the second embodiment of the tractor drive device 200 may further include a stabilizing tubular frame similar to one depicted in the first embodiment 100, which is fixably attached to the main gearbox 210 and a sealed motor housing 204 containing a drive motor 205 connected to a motor brake mechanism 207. In the illustrated second embodiment of the tractor drive device 200, the drive motor 205 is a bidirectional electric motor. Alternatively, the drive motor 205 could be a hydraulic or pneumatic motor, however, electric motors are usually preferred. The drive motor 205 and motor brake mechanism 207 are enclosed within a sealed motor housing 204 to prevent ambient air and foreign matter from contaminating the drive motor 205. Indeed, the sealed motor housing 204 may be pressurized with an inert gas (e.g., nitrogen) to protect the electrical components from the incursion of moisture or explosive or corrosive gases. The sealed motor housing 204 may also include one or more hermetically sealable access points 206 for connecting electrical and control cords to the drive motor 205.

As with the previously disclosed first embodiment, the second embodiment of the tractor drive device 200 of the present invention may also include a remote console connected via the sealable access points 206 to supply power (e.g., electrical, pneumatic, hydraulic) and control the overall system. Additionally, a compact battery pack connected via the sealable access points 206 may be used to power the device 200. Such a remote console enables operation of the tractor drive device 200 from a safe distance, typically 10 meters or more from the location of the pipe and device 200. Such a remote console may include directional control (forward and reverse) and a control lever for remotely shutting off the supply of high-pressure water to the hose or flexible lance 125. Such a remote console may also include computerized control to automate repetitive tasks easily. Such a remote console may be compact, to be worn around a user's neck, or may be fastened to a floor support or other structure. A suitable lance hose take-up drum or reel may also be provided to feed out, take in and restore lance hose 125.

The output shaft of the drive motor 205 is coupled to the input of the motor brake mechanism 207, which in turn connects, via its output shaft to a reduction gearbox 208. The reduction gearbox 208 provides a reduction ratio suitable for the task involved, and may, for example, be 5:1, 10:1 or about 20:1 in order to provide appropriate torque to the roller mechanisms for operation of the tractor drive device 200 to suitably propel a flexible lance 125 into and out of the pipe. In the illustrated second embodiment, the reduction gearbox 208 is a 90° gearbox in order to enhance the overall compactness and stability of the tractor drive device 200. However, it is understood that in other embodiments the orientation of the drive motor 205, motor brake mechanism 207 and reduction gearbox 208 could be inline or at any acute angle from the embodiment illustrated. The reduction gearbox 208 includes a mounting plate that is fixably attached and sealed to the main gearbox 210 and its output shaft 209 is coupled to a pinion drive gear 214 contained within the main gearbox 210.

The main gearbox 210 of the second embodiment of the tractor drive device 200 is very similar to the main gearbox 210 of the first embodiment of the tractor drive device 200. Whereas the main gearbox 10 of the first embodiment 100 includes a pinion drive gear 14 configured between the two upper drive gears 16A, 16B (See FIG. 2B), as shown in FIG.

Figure 10B:
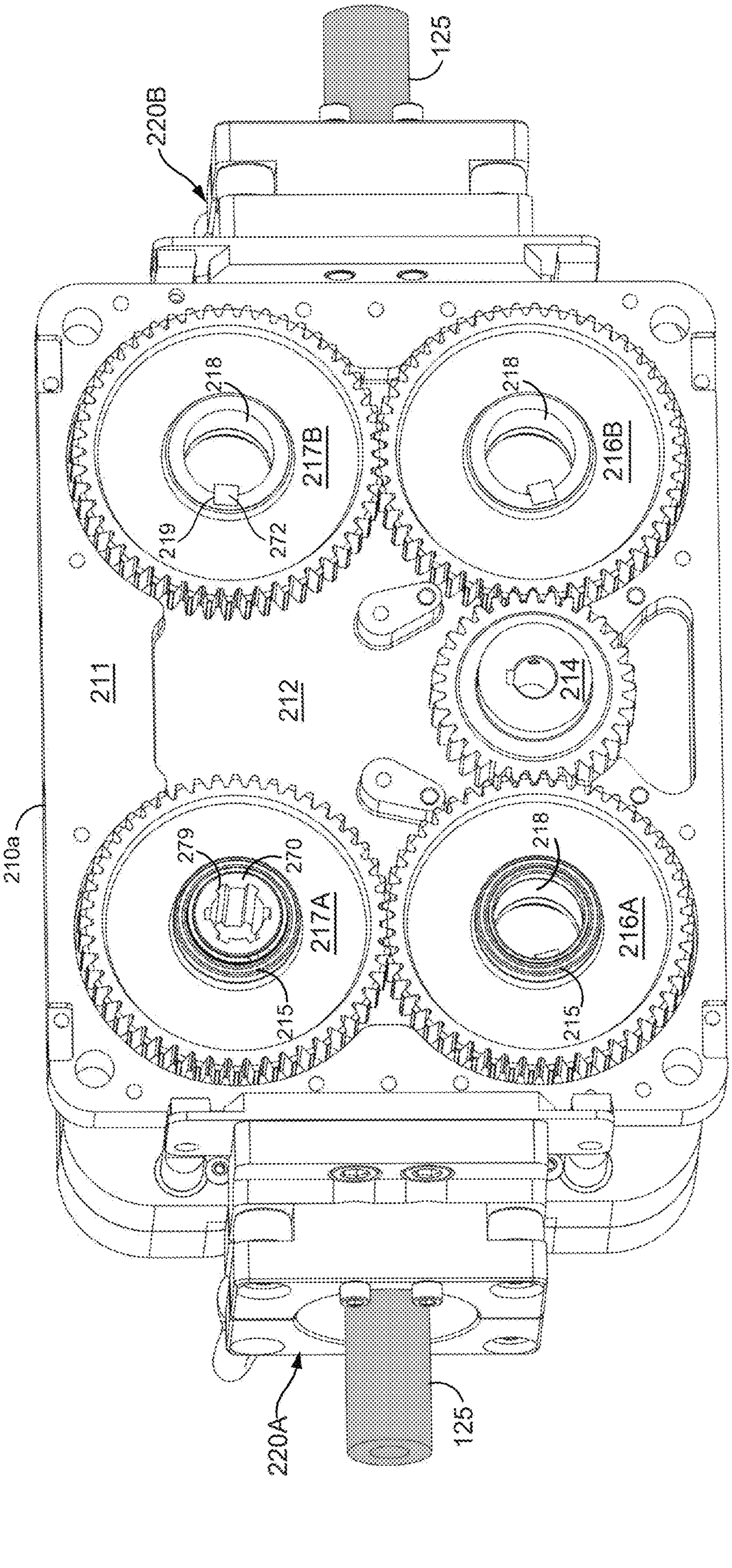
FIG. 10B is a partial cut-away, rear perspective view of the tractor device shown in FIG. 10A.
Figure 11A:
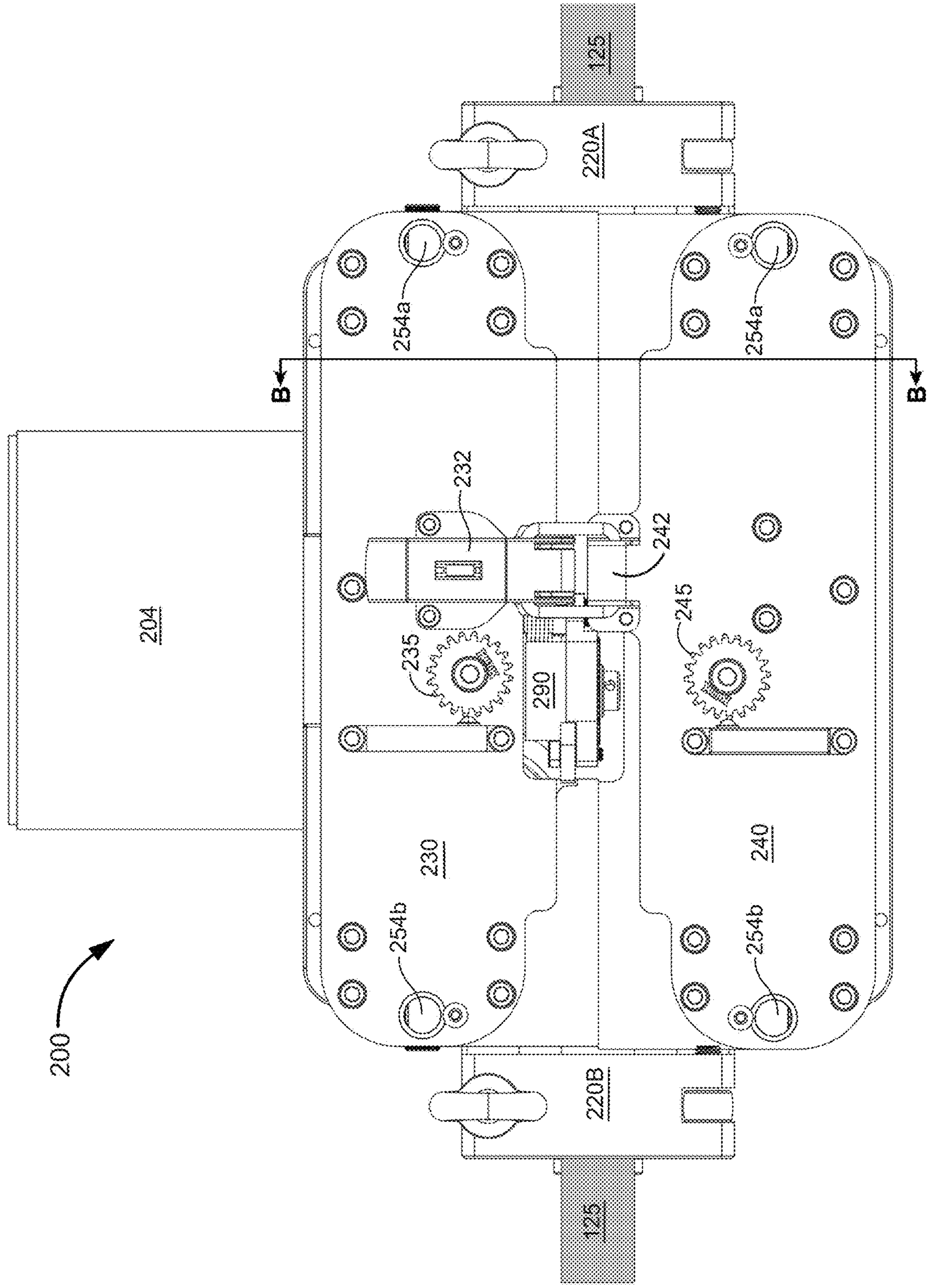
FIG. 11A is a front elevation view of the tractor device shown in FIG. 9A.
Figure 11B:
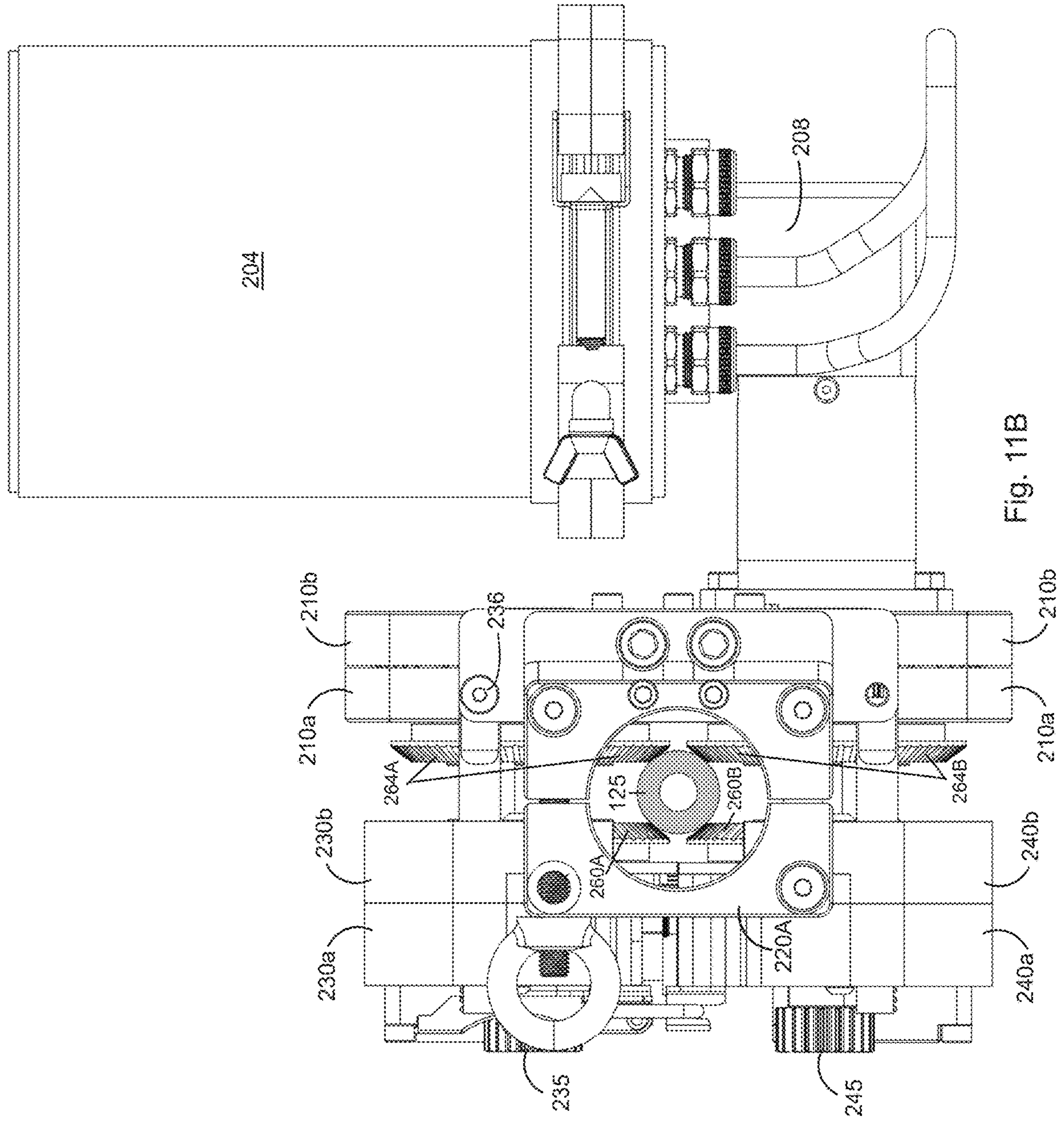
FIG. 11B is a right-side elevation view of the tractor device of the tractor device shown in FIG. 9A.

10B the main gearbox 210 of the second embodiment of the tractor drive device 200 features a pinion drive gear 214 configured between the two lower drive gears 216A, 216B. With reference now to FIGS. 9B and 10B, in addition to the pinion drive gear 214, the gearworks contained within the main gearbox 210 includes four drive gears arranged in a fixed configuration. The rotating pinion drive gear 214 drives the gearworks enclosed within the main gearbox 210. The main gearbox 210 comprises a front half or section 210*a* and a matching back half or section 210*b*. The main gearbox 210 contains the gearworks within a void or open space 212 formed within each gearbox section 210*a*, 210*b*. A gasket 211 configured about the periphery of the gearbox sections seals the void or open space 212 within the joined main gearbox 210.

The main walls 210*c*, 210*d* of gearbox sections 210*a*, 210*b*, respectively, include four pairs of co-axial matching apertures 228. Each aperture 228 includes a co-aligned mount or socket on the interior surface of the gearbox dimensioned for receiving a co-axial ball bearing race element 215 (e.g., ball bearing). The gearworks comprises four gears sandwiched between the interior surfaces of the main wall 210*c*, 210*d* of gearbox sections 210*a*, 210*b*, respectively, with each gear configured in a fixed co-axial alignment with one of the four co-axial pairs of apertures 228 and their respective bearing elements 215.

The gearbox sections 210*a*, 210*b* may be made of a light metal plate material such as aluminum. Optionally, other materials such as a steel, stainless steel, structural plastic, carbon fiber or fiberglass plate material having the requisite structural strength and rigidity could be used either in whole or composite construction. For example, the gearbox sections 210*a*, 210*b* may be made of machined aluminum plate while stub tube clamp fittings 220A, 220B, tubular frame (not shown) and sealed motor housing 204 could be made of a steel.

The four main gears in the gearworks are configured to rotate in such a way that the four attached or connected roller assemblies rotate in a coordinated manner to either advance or retract the flexible lance 125 through the tractor drive device 200. For example, the lower drive gears 216A, 216B are directly driven by the pinion drive gear 214, while the lower drive gears 216A, 216B, in turn, drive the upper driven gears 217A, 217B. The upper driven gears 217A, 217B and the lower drive gears 216A, 216B are of equal diameter. Thus, when the pinion drive gear 214 rotates in a clockwise (CW) direction it causes both lower drive gears 216A, 216B rotate in a counterclockwise (CCW) direction, while the upper driven gears 217A, 217B both rotate in a clockwise (CW) direction. Conversely, when the pinion drive gear 214 rotates in a counter-clockwise (CCW) direction both lower drive gears 216A, 216B rotate in a clockwise (CW) direction, while the upper driven gears 217A, 217B both rotate in a counter-clockwise (CCW) direction.

With reference to FIGS. 10B, 14A-D, and 16A-B, the upper and lower gears 216, 217 in the main gearbox 210 are of equal diameter. Each gear 216, 217 includes a smooth central aperture 218 having an internal parallel keyway (i.e., keyjoint) 219 formed therein. A threaded set screw hole may be configured above the keyjoint 219 for securing a key 272 within the internal parallel keyway 219 and into a recess 276 formed in a main gearbox hub 270. As shown in FIG. 10B, the first lower drive gear 216B and the first upper driven gear 217B each illustrate only the gears themselves. In contrast, the second lower drive gear 216A is depicted with a co-axial ball bearing race element 215 properly configured in relation to the second lower drive gear 216A, and the second upper driven gear 217A is depicted with a co-axial ball bearing race element 215 and a main gearbox hub 270 properly configured in relation to the second upper driven gear 217A.

Each of the upper and lower gears 217, 216 in the second embodiment of the tractor drive device 200 is used to drive a separate split-sheave roller assembly 280 to advance and retract the flexible lance 125 longitudinally along its length through the tractor drive device 200. With reference now to FIGS. 14A-D, an embodiment of the split-sheave roller assembly 280 of the second embodiment of the tractor drive device 200 of the present invention is depicted. Each roller assembly 280 comprises a first or main gearbox hub 270, connected to its respective gear 216, 217. With additional reference to FIGS. 15A-5D, each main gearbox hub 270 includes a larger diameter hub portion 273 and a longer, but narrower diameter body portion 275. The body portion 275 of the main gearbox hub 270 is designed to be inserted into its respective aperture (e.g., 228*b*) in the front section 210*a* of the main gearbox 210, through its respective first or front co-axial ball bearing race element 215, through the smooth central aperture 218 of its respective gear 216 or 217, and through its respective second or rear co-axial ball bearing race element 215 and on through its respective co-axial aperture (e.g., 228*a*) in the rear section 210*b* of the main gearbox 210. Each main gearbox hub 270 may further include a spiral retaining ring 278 secured in a circumferential groove 277 formed in the body portion 275 of the main gearbox hub 270 for maintaining its proper alignment within the main gearbox 210.

With reference again to the Figures and especially FIGS. 9A-9B, a first split-sheave roller half (e.g., 264° C.) is attached to a first gearbox hub (e.g., 270° C.) configured in its respective co-aligned apertures (e.g., 228*a*, 228*b*) in the main gearbox 210 while a matching or second split-sheave roller half (e.g., 260C) is attached to a second gearbox hub (e.g., 270C') configured in its respective aperture (e.g., 228*c*) in the upper clamp housing 230. The respective matching apertures 228 in the main gearbox 210 and upper 230 or lower 240 clamp housing are co-axially aligned. Each of the split-sheave roller halves 260, 264 is rotatively coupled to its respective matching co-aligned roller half by means of a spindle shaft mechanism 238 configured between the pair of adjacent and co-aligned gearbox hubs (e.g., 270C, 270C').

With reference now to FIGS. 14A-D and 18A-B, spindle shaft mechanism 238 comprises a connection shaft 239 having apertures or holes 247 on opposing ends for receiving retaining pins 244 for connecting splined spindle fittings 243. The splined fittings 243 have a cross-section that is complimentary to that of the splined bore 279 of its respective gearbox hub 270. Thus, when properly aligned with its respective gearbox hubs 270 the spindle shaft mechanism 238 is slidably coupled to both matching gearbox hubs and rotatively couples the two matching gearbox hubs 270. In addition, the apertures or holes 247 through the opposing ends of the connection shaft 239 are preferably oval-shaped so as to allow positional slack or looseness in each clamp housing when shut down and unlocked, thereby allowing the clamp housings to be pivoted up or down and away from contact with the hose or flexible lance 125. (See e.g., FIGS. 18A-B)

Each main gearbox hub (See e.g., FIG. 18A 270A, 270B) is fixably attached to its respective gear 216 or 217 by means of a mechanical coupling. The body portion 275 of the main gearbox hub 270 includes a recess 276 formed therein and configured to receive a key 272 affixed in the internal parallel keyway (i.e., keyjoint) 219 of the smooth central aperture 218 of its respective gear 216 or 217. Each main gearbox hub 270 is designed to rotate when its respective gear 216 or 217 rotates. However, the hub portion 273 portion of the main gearbox hub 270 is designed so that it does not make contact with the exterior surface of the front half or section 210*a* of the main gearbox 210. The main gearbox hub 270 further includes a splined bore 279 having a cross-section complimentary to that of a splined spindle fitting 243 attached to the end of a spindle shaft mechanism 238. The spindle shaft mechanism 238 comprises a shaft that couples each main gearbox hub 270 to its matching or second gearbox hub (See e.g., FIG. 18A 270A', 270B') configured in its respective upper or lower clamp housing 230/240. Thus, the individual halves of each split-sheave roller assembly 280 rotate in unison as its respective gear 216, 217 rotates.

The inboard or rear roller half 264 of the second embodiment of the tractor drive device 200 is selectively attached to the hub portion 273 of the main gearbox hub 270 by means of screw fasteners 268 (See FIGS. 14C and 18A) attached to threaded holes 271 in the hub portion 273 portion of the main gearbox hub 270. The inboard or rear roller half 264 also includes a central aperture 264*b* which allows the spindle shaft mechanism 238 to easily pass through. The inboard or rear roller half 264 may further include a circular sealing device 265 configured on its back or rear-facing side closest to the exterior surface of the front half or section 210*a* of the main gearbox 210. The sealing device 265 restricts the flow of any contaminants into and out of the aperture 228 in the front section 210*a* of the main gearbox 210.

With additional reference to FIGS. 9A-B, 12A-B, and 18A-B as previously disclosed, each split-sheave roller assembly 280 includes two co-aligned and co-axial gearbox hubs 270. While a first gearbox hub (e.g., 270C) is configured within the main gearbox, a matching or second split-sheave roller half (260C) is attached to a second gearbox hub 270C' configured in the upper clamp housing 230. The upper clamp housing 230 includes two laterally spaced gearbox hubs 270, each of which is aligned with a matching coaligned and co-axial gearbox hub configured in the upper main gearbox 210. Similarly, the lower clamp housing 240 includes two laterally spaced gearbox hubs 270, each of which is aligned with a matching coaligned and co-axial gearbox hub configured in the lower main gearbox 210. The gearbox hubs 270 configured in the upper and lower clamp housings 230/240 are essentially the same in form and function as previously disclosed gearbox hubs 270 configured in the main gearbox 210.

Figure 12A:
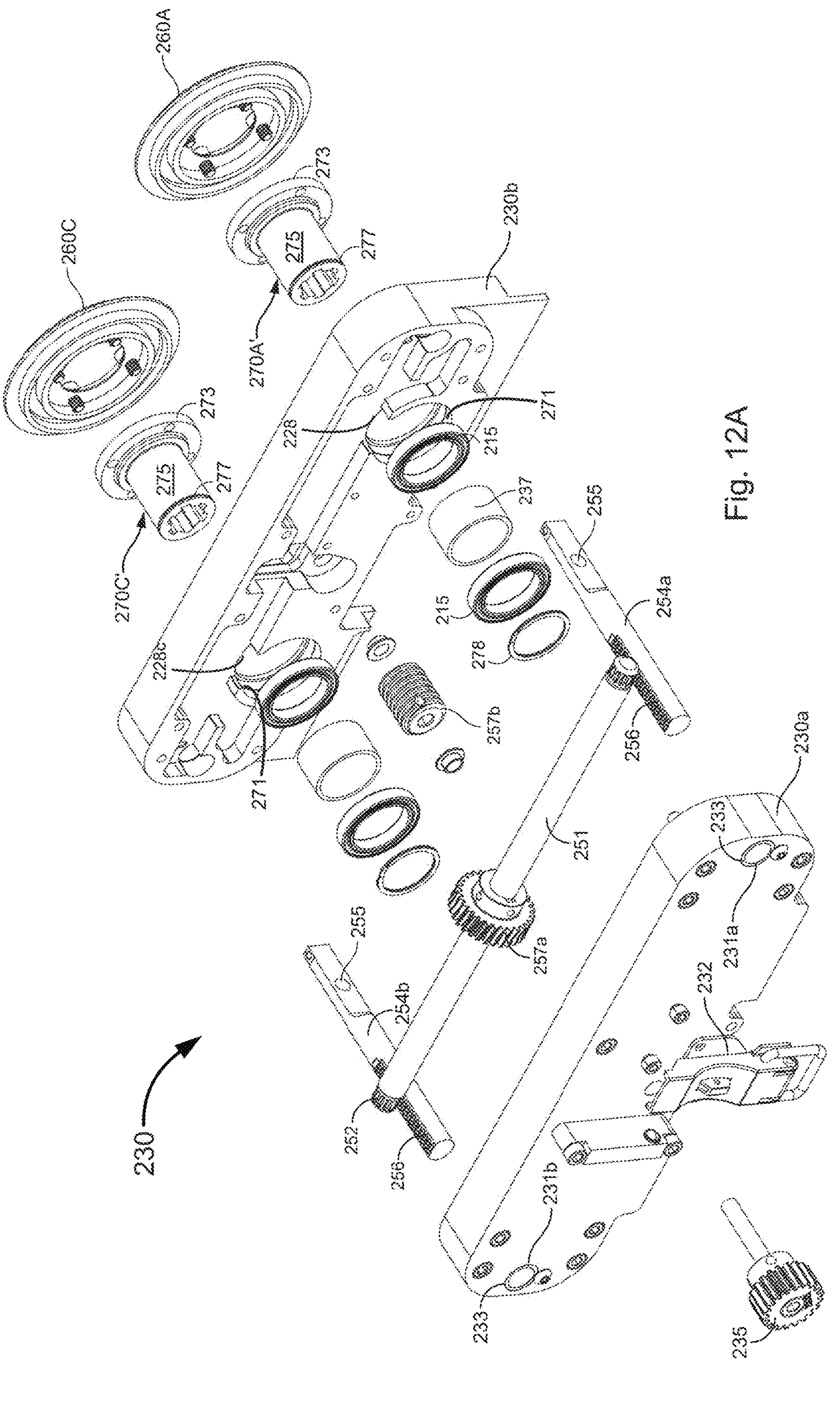
FIG. 12A is an exploded front perspective view of the upper adjustable clamp housing containing a sheave roller assembly.

As shown in FIG. 12A, the upper clamp housing 230 is comprised of two sections or halves—a first or front facing section 230*a* and a second or rear facing section 230*b*. The upper clamp housing 230 contains two laterally spaced gearbox hubs 270A', 270C' configured in two apertures 228 extending through the wall of the rear facing section 230*b*. The two laterally spaced gearbox hubs 270A', 270C' are each aligned with a respectively matching coaligned and co-axial gearbox hubs configured in the upper main gearbox 210. The gearbox hubs 270A', 270C' configured in the upper clamp housing 230 are essentially the same in form and function as previously disclosed gearbox hubs 270 configured in the main gearbox 210. However, the two gearbox hubs 270A', 270C' in the upper clamp housing 230 may also include a spacer element 237 positioned between the two ball bearing race elements 215, which are configured in sockets 271 formed into the interior walls of the front facing section 230*a* and the rear facing section 230*b* of the upper clamp housing 230. Each of the gearbox hubs 270A', 270C' in the upper clamp housing 230 may further include a spiral retaining ring 278 secured in a circumferential groove 277 formed in the body portion 275 of the gearbox hub 270 to maintain its proper alignment within the upper clamp housing 230. As previously noted, the first split-sheave roller half (e.g., 264° C.) is attached to the first main gearbox hub (e.g., 270C) configured in its respective co-aligned apertures (e.g., 228*a*, 228*b*)(See FIG. 9B) in the main gearbox 210 while a matching or second split-sheave roller half (e.g., 260C) is attached to a second gearbox hub (e.g., 270C') configured in its respective aperture (e.g., 228*c*) in the upper clamp housing 230. The respective matching apertures 228 in the main gearbox 210 and upper 230 or lower 240 clamp housing are co-axially aligned. Each of the split-sheave roller halves 260, 264 is rotatively coupled to its respective matching co-aligned roller half by means of a connecting spindle shaft mechanism 238 configured between the pair of adjacent and co-aligned gearbox hubs (e.g., 270C, 270C').

Figure 12B:
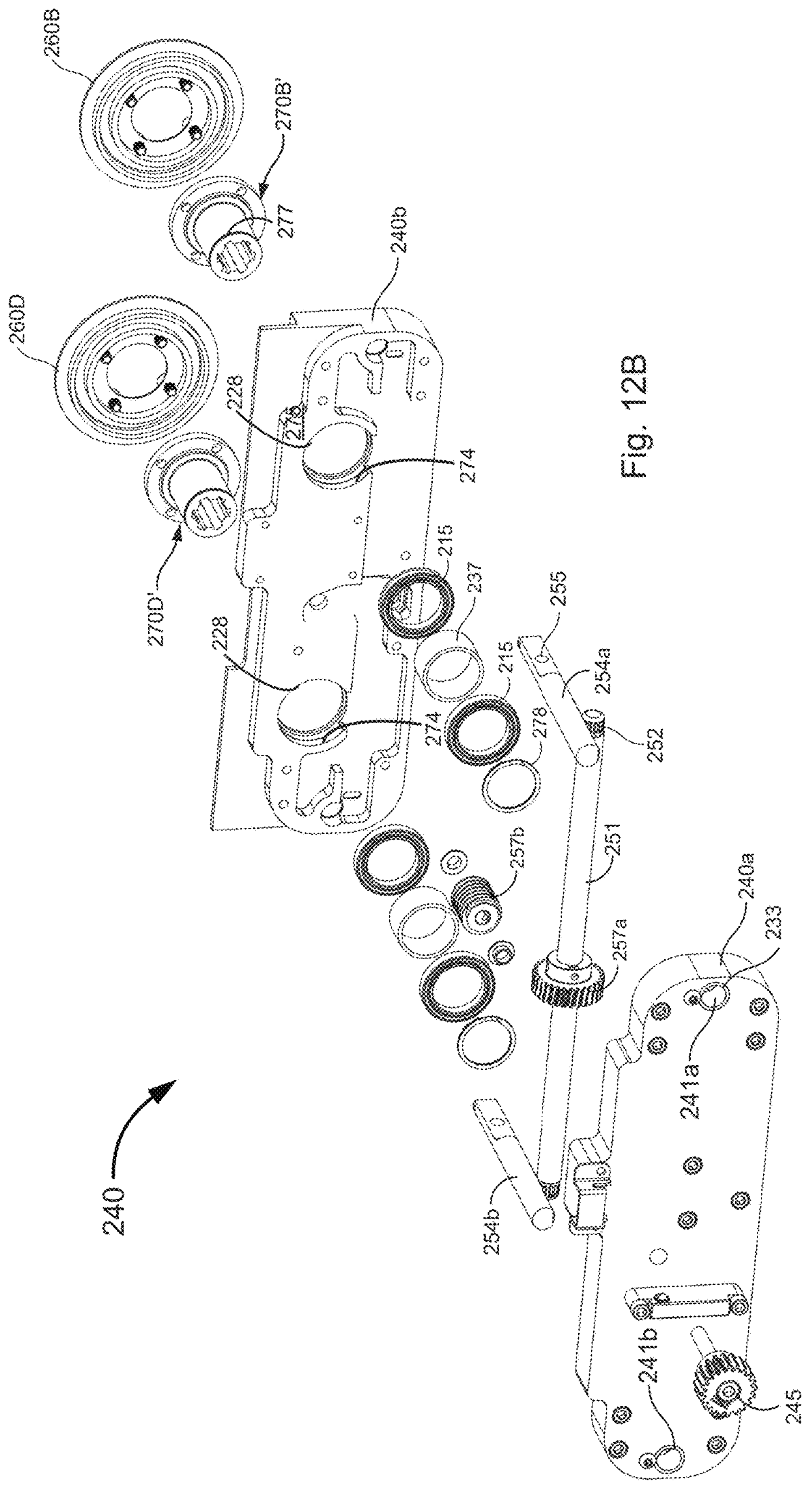
FIG. 12B is an exploded front perspective view of the lower adjustable clamp housing containing a sheave roller assembly.

Likewise, as shown in FIG. 12B, the lower clamp housing 240 is comprised of two sections or halves—a first or front facing section 240*a* and a second or rear facing section 240*b*. The lower clamp housing 240 also contains two laterally spaced gearbox hubs 270B', 270D' configured in two apertures 228 extending through the wall of the rear facing section 240*b*. The two laterally spaced gearbox hubs 270B', 270D' are each aligned with a respectively matching coaligned and co-axial gearbox hubs configured in the lower main gearbox 210. The gearbox hubs 270B', 270D' configured in the lower clamp housing 240 are essentially the same in form and function as previously disclosed gearbox hubs 270 configured in the main gearbox 210. However, the two gearbox hubs 270B', 270D' in the lower clamp housing 240 may also include a spacer element 237 positioned between the two ball bearing race elements 215, which are configured in sockets 274 formed into the interior walls of the front facing section 240*a* and the rear facing section 240*b* of the lower clamp housing 240. Each of the gearbox hubs 270B, 270D' in the lower clamp housing 240 may further include a spiral retaining ring 278 secured in a circumferential groove 277 formed in the body portion of the gearbox hub to maintain its proper alignment within the lower clamp housing 240. As previously noted, the first split-sheave roller half (e.g., 264B) is attached to the first gearbox hub (e.g., 270B) configured in its respective co-aligned apertures (e.g., 228*a*, 228*b*)(See FIG. 9B) in the main gearbox 210 while a matching or second split-sheave roller half (e.g., 260B) is attached to a second gearbox hub (e.g., 270B') configured in its respective aperture (e.g., 228) in the lower clamp housing 240. The respective matching apertures 228 in the main gearbox 210 and upper 230 or lower 240 clamp housing are co-axially aligned. Each of the split-sheave roller halves 260, 264 is rotatively coupled to its respective matching co-aligned roller half by means of a connecting spindle shaft mechanism 238 configured between the pair of adjacent and co-aligned gearbox hubs (e.g., 270B, 270B').

Figure 13:
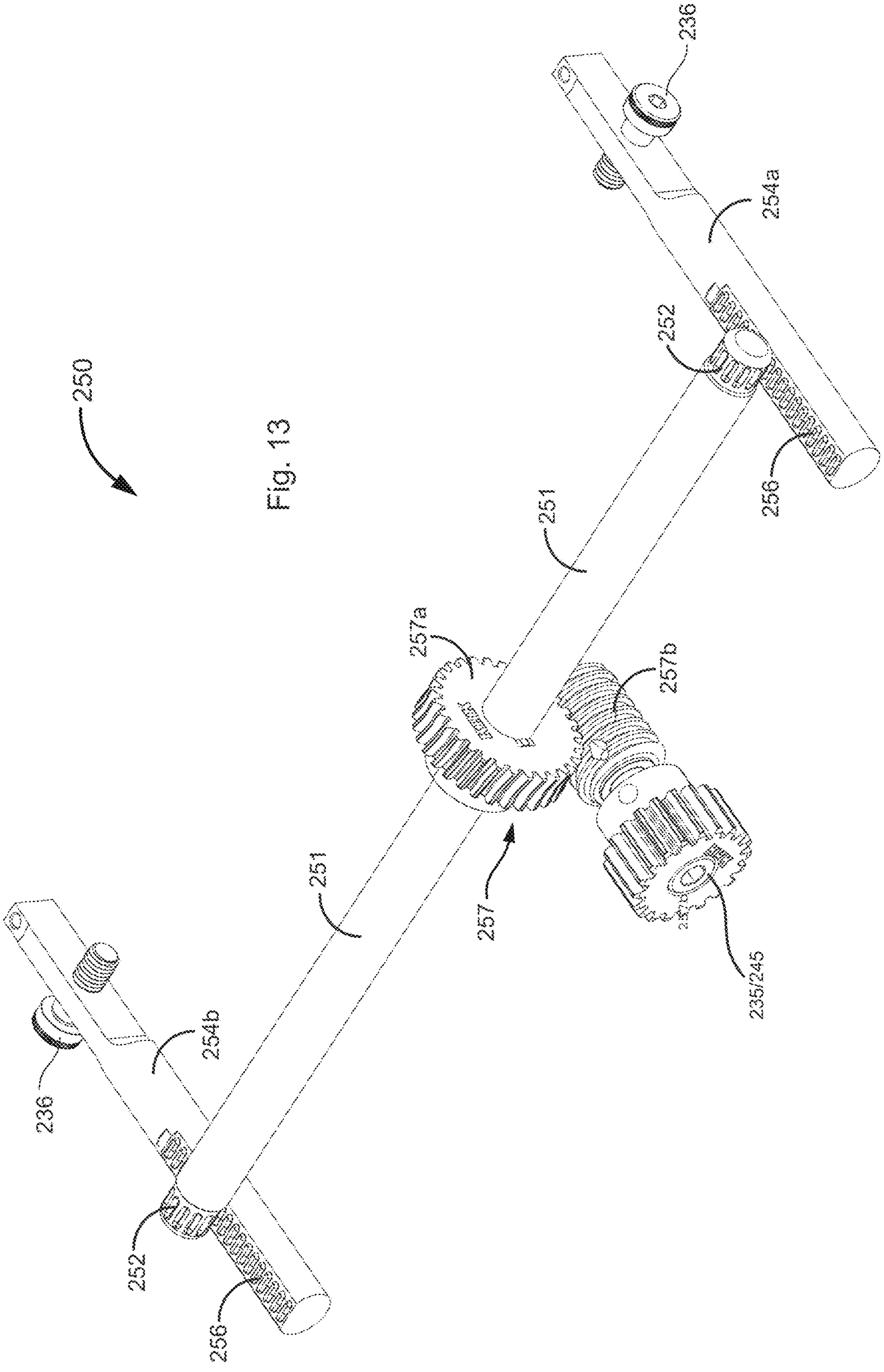
FIG. 13 is an isolated perspective view of the adjustable clamping mechanism of the upper and lower clamp housings.
Figure 14A:
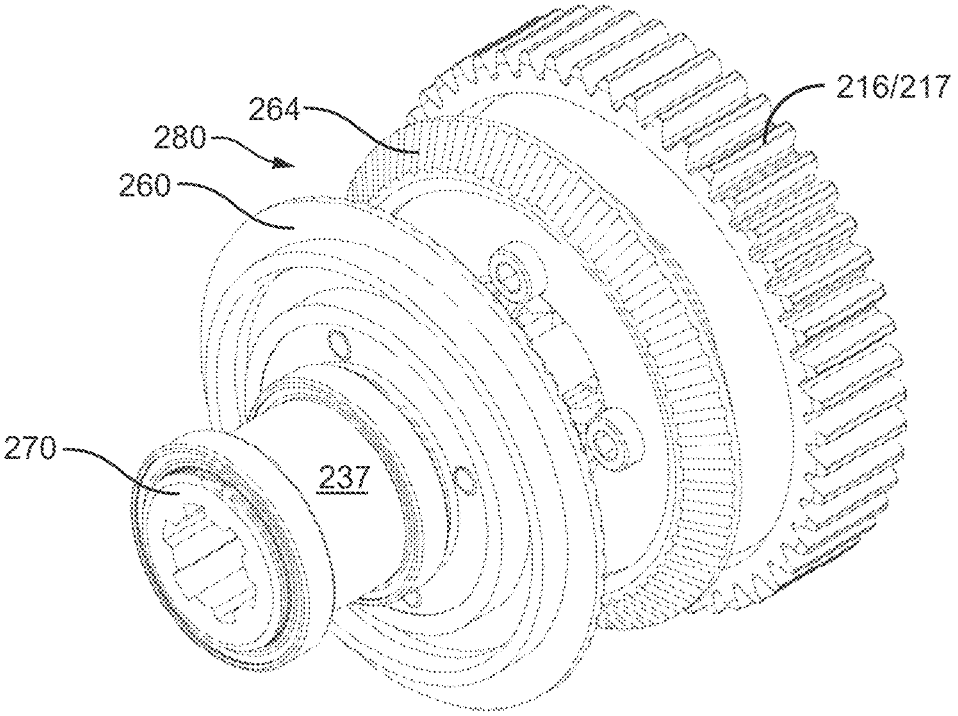
FIG. 14A is a front perspective view of the adjustable split-sheave roller assembly shown in the upper and lower adjustable clamp housings.
Figure 14B:
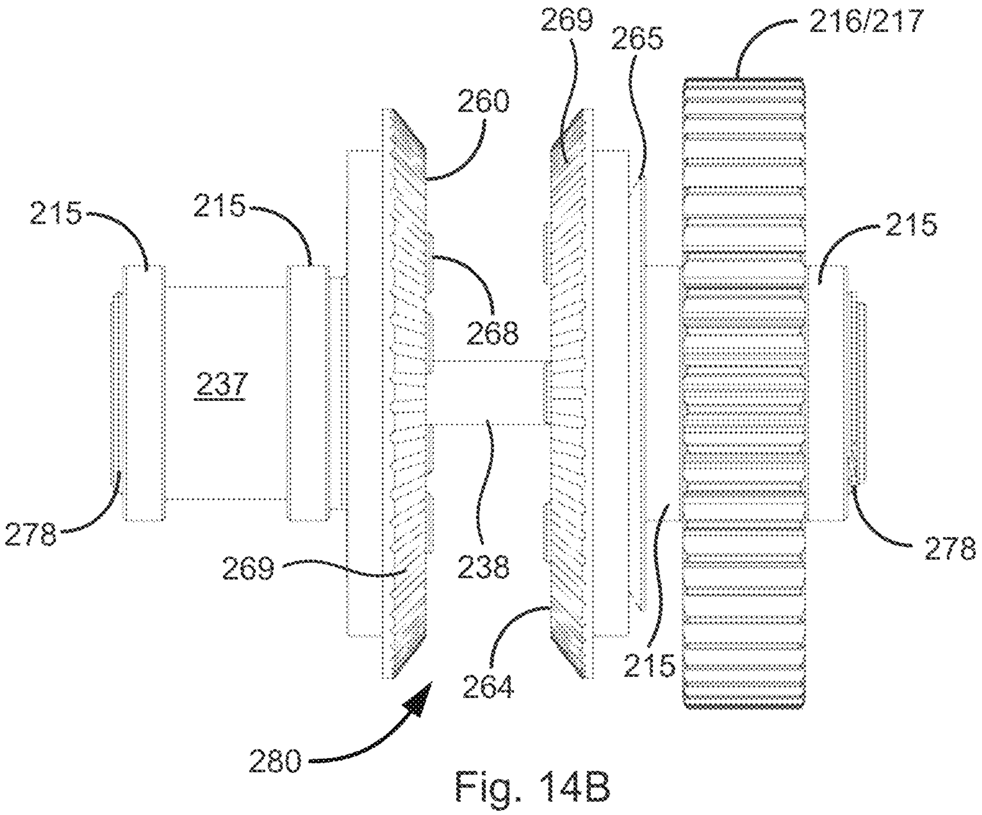
FIG. 14B is a side view thereof.
Figure 14C:
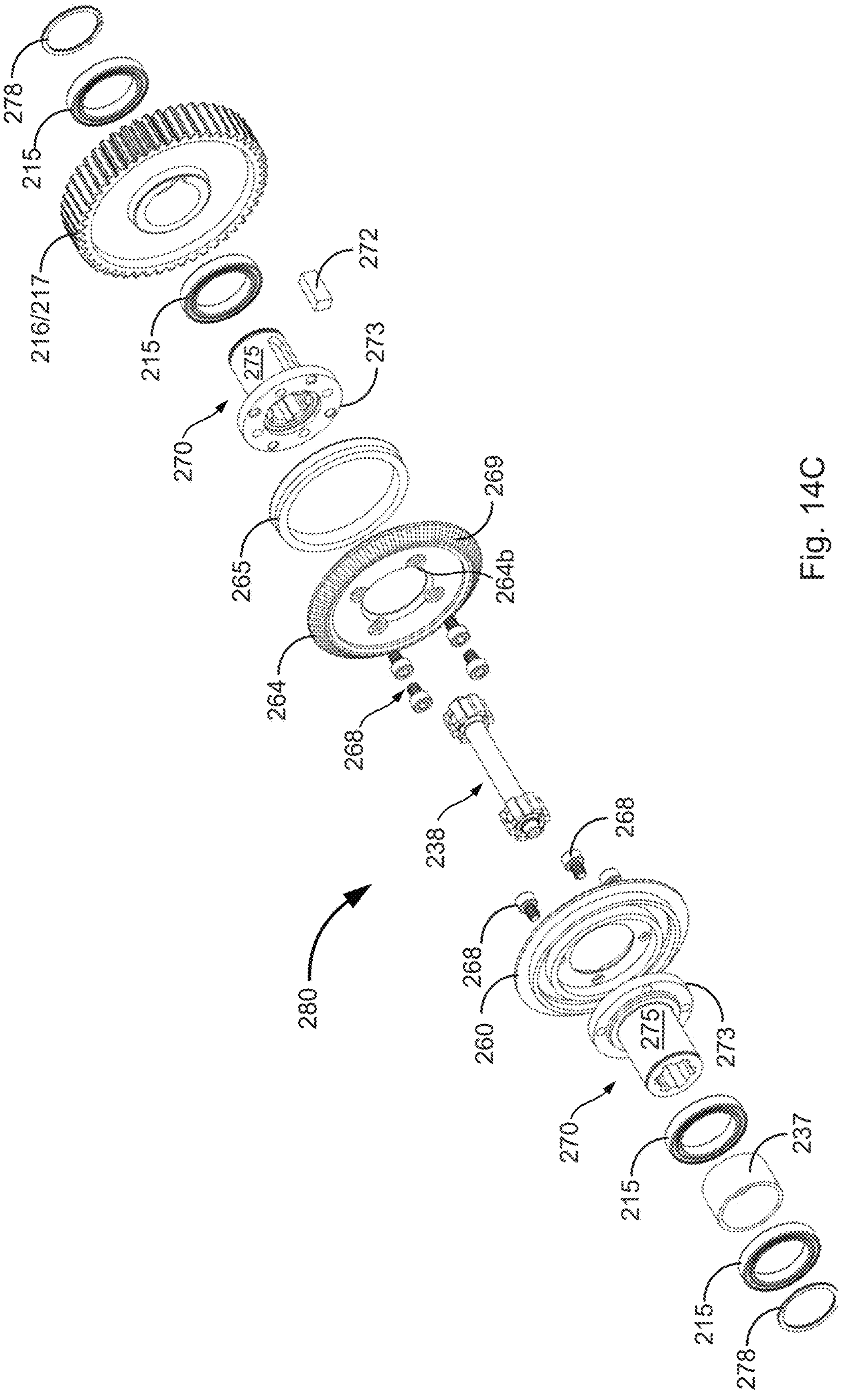
FIG. 14C is an exploded perspective view of the adjustable split-sheave roller assembly shown in FIG. 14A.
Figure 14D:
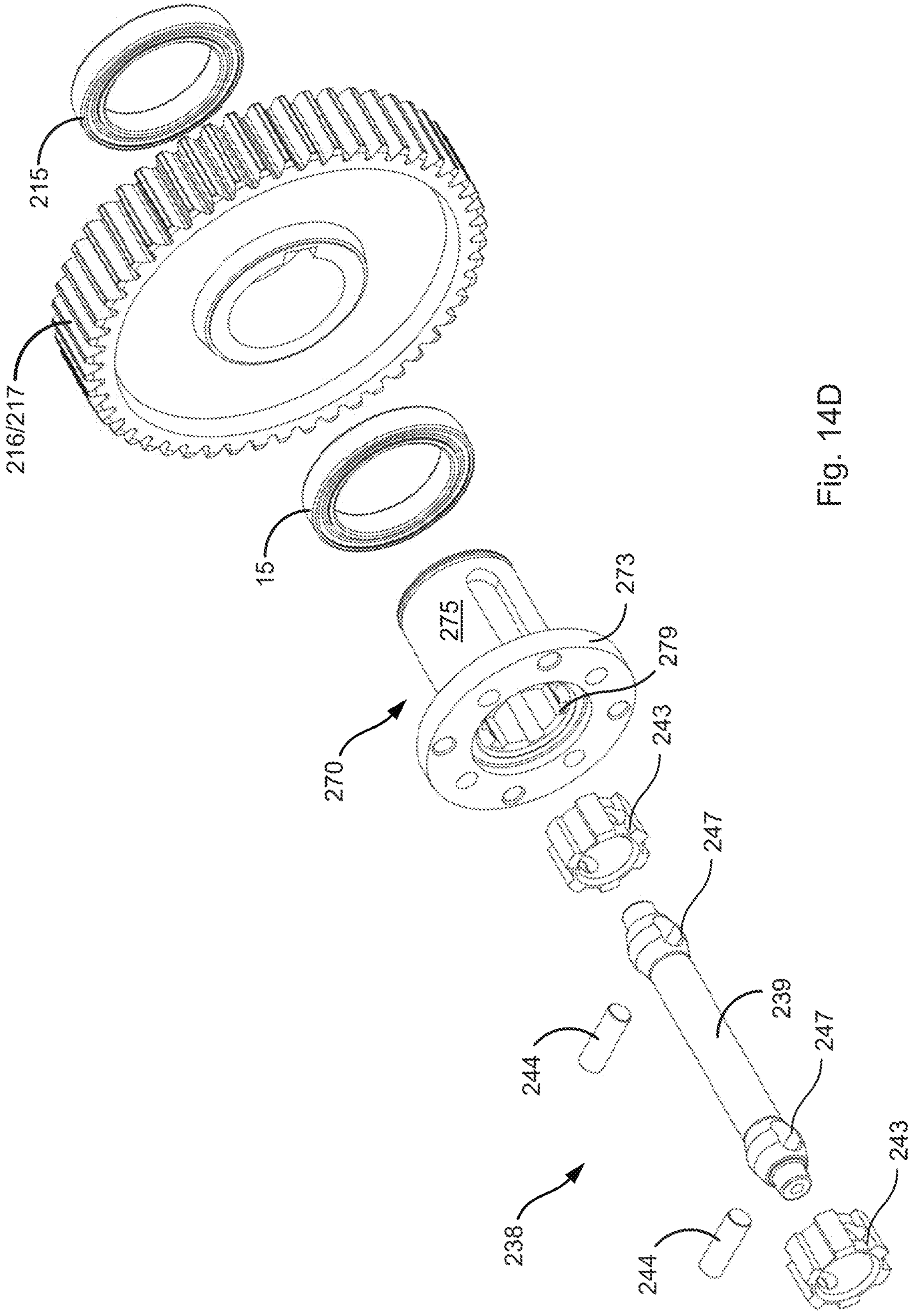
FIG. 14D is an isolated perspective view of one set of the adjustable split-sheave roller assembly with connecting shaft and splined connectors of the adjustable split-sheave roller assembly shown in FIG. 14A.
Figures 17A, 17B:
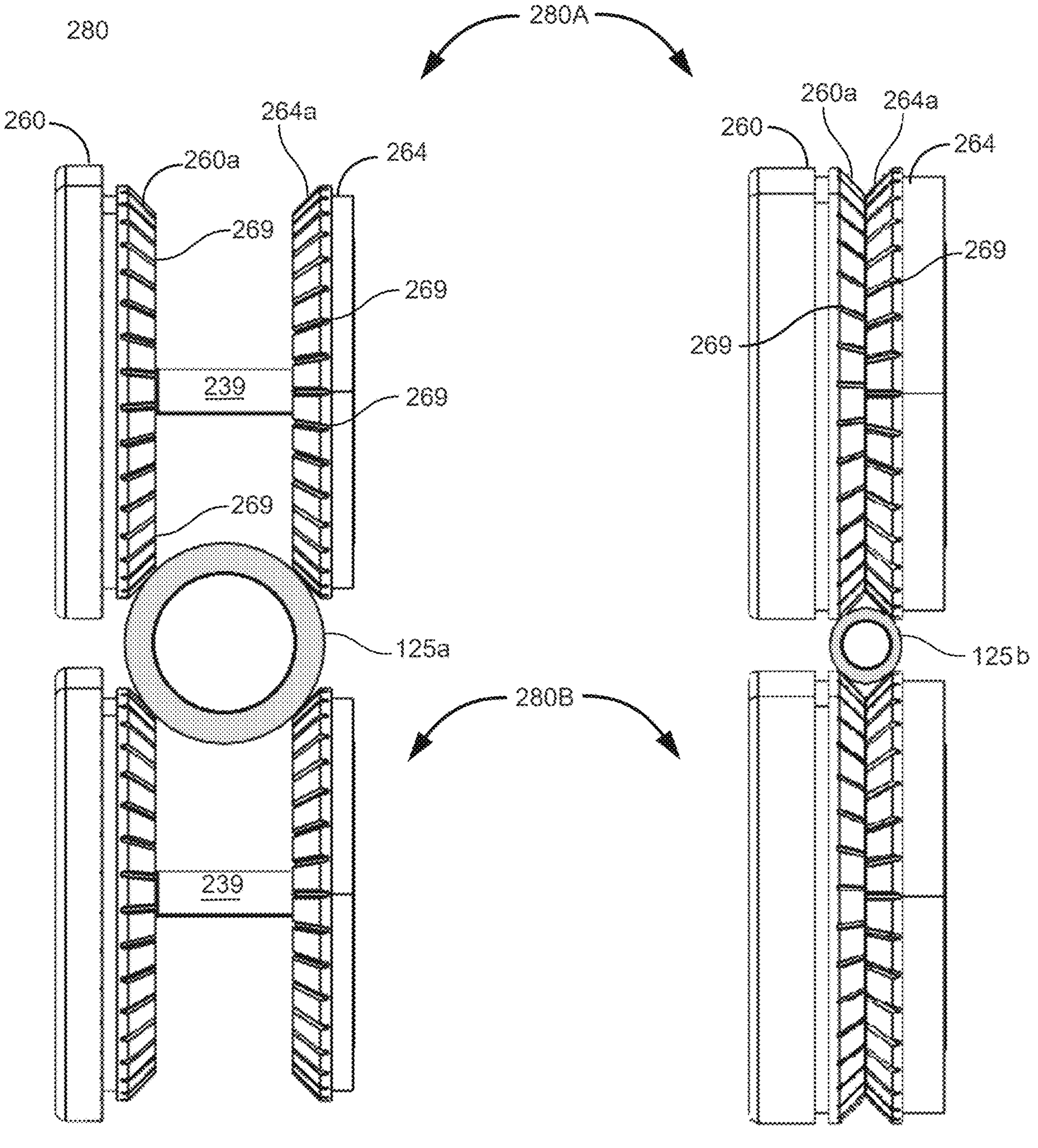
FIG. 17A is a side view of one set of the split sheaves of an upper roller and lower roller with 40 mm diameter flexible lance hose therebetween.
FIG. 17B is a side view of one set of the split sheaves of an upper roller and lower roller with a 15 mm diameter flexible lance hose therebetween.
Figure 18A:
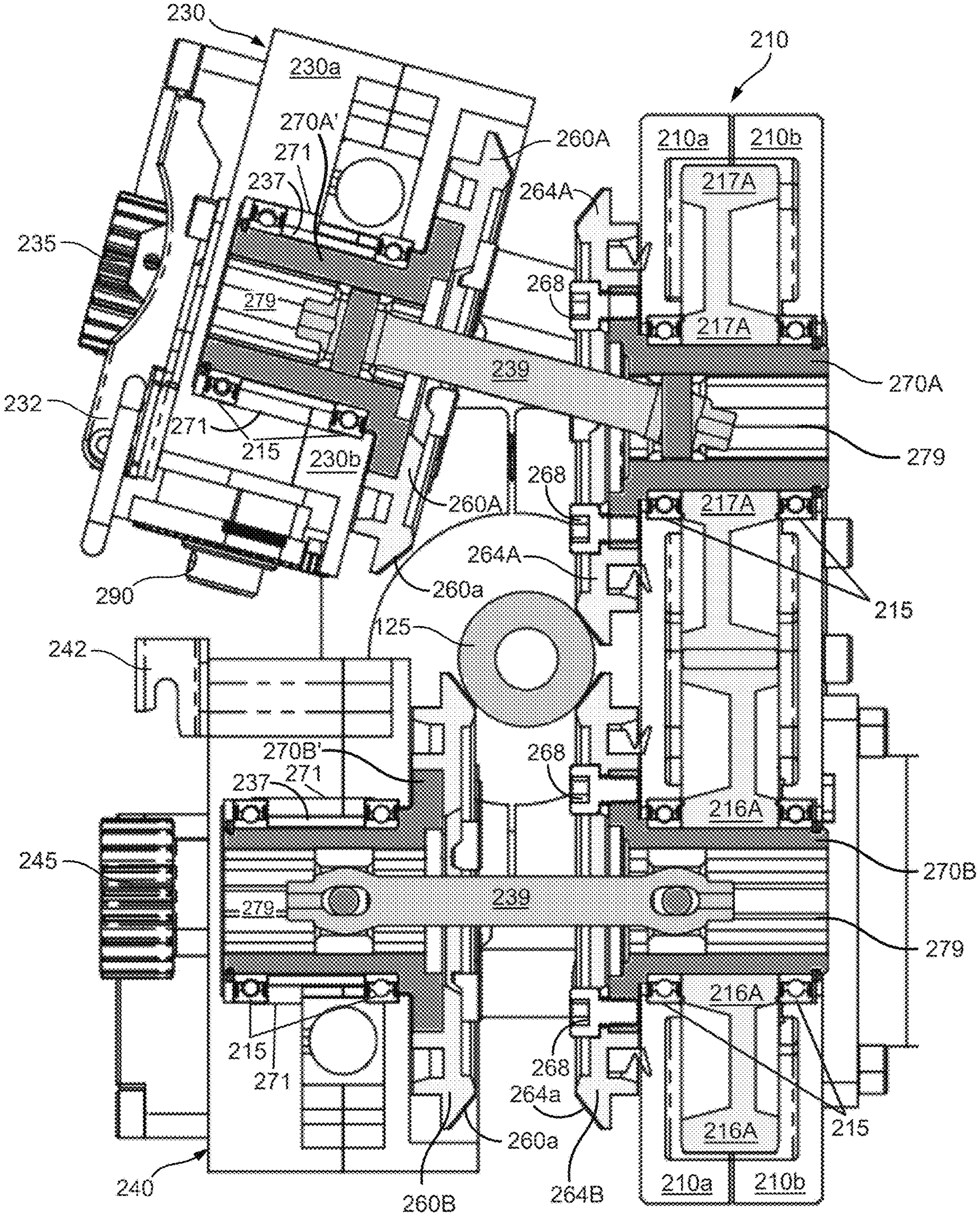
FIG. 18A is a partial cross-sectional side view taken along section B-B shown in FIG. 11A with the adjustable clamp housing containing a sheave roller assembly an opened position.
Figure 18B:
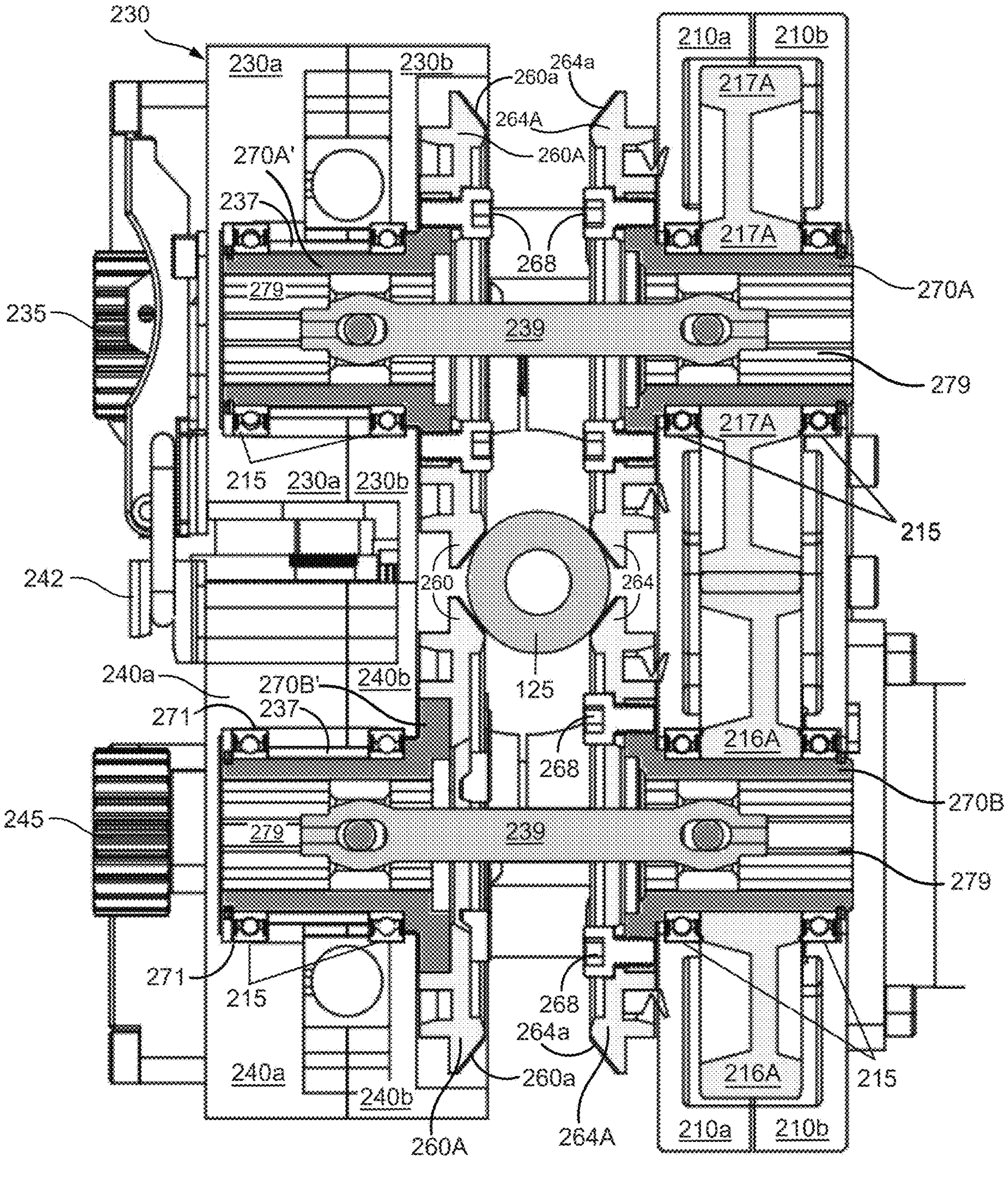
FIG. 18B is a partial cross-sectional side view taken along section B-B shown in FIG. 11A with the upper and lower adjustable clamp housings in the closed position.

With reference to FIGS. 12A-B and 13 an embodiment of the adjustable clamping mechanism 250 is depicted. An adjustable clamping mechanism 250 is configured in each of the clamp housings 230, 240 to properly adjust the lateral distance between the roller halves by adjusting the lateral distance of the upper and lower clamp housing from the main gearbox. As shown in the Figures, each adjustable clamping mechanism 250 includes two connector rods 254 positioned in bore holes apertures formed through the clamp housings 230, 240. For example, as shown in FIG. 12A, the upper clamp housing 230 includes two widely spaced bore holes apertures 231*a*, 231*b* that extend through both the front section 230*a* and the rear section 230*b* of the upper clamp housing 230. The bore hole apertures 231*a*, 231*b* may also include co-aligned circular bushings 233 for wear resistance. The two connector rods 254*a*, 254*b* extend out of the rear section 230*b* where a hole 255 in the connector rod 254 is used to securely attach the connector rod 254 with a fastener 236 to a mounting hole 226 on the side of the main gearbox 210. Each connector rod 254 further includes a rack gear portion 256 near the rear of each connector rod 254. The rack gear portion 256 is designed intermesh with a pinion gear portion 252 configured on each of the opposing ends of a lateral traversing rod 251. While free to rotate within its respective clamp housing, each lateral traversing rod 251 is effectively captured between the front and rear sections of its respective clamp housing. Thus, as the lateral traversing rod 251 rotates, the pinion gear portions 252 advance and retract along the rack gear portion 256 of each connector rod 254 causing the respective clamp housing to advance and retract towards the main gearbox 210.

As shown in the Figures, the rack and pinion gear system of the adjustable clamping mechanism 250 further includes a worm gear mechanism 257 configured in the middle of the lateral traversing rod 251. The worm gear mechanism 257 comprises a worm gear wheel 257*a* co-aligned and fixably attached to the middle of the lateral traversing rod 251. The worm gear wheel 257*a* is intermeshed with a screw thread gear 257*b* which is connected to a clamping adjustment device 235, 245 through the front facing sections 230*a*, 240*a* of the upper and lower clamp housings 230, 240. By rotating the clamping adjustment device 235, 245 the screw thread gear 257*b* turns, causing the worm gear wheel 257*a* to also rotate, which causes the lateral traversing rod 251 to also rotate. As the lateral traversing rod 251 rotates, its pinion gear portion 252 advances or retracts along the rack gear portion 256 of its respective connector rod 254. The vise action of the rack and pinion gear system of the adjustable clamping mechanism 250 allows precise adjustment and compressive force where needed to the upper and lower clamp housings 230, 240.

The ability of the split-sheave roller assembly 280 to quickly clamp and release the flexible lance or hose 125 greatly enhances the utility, safety and effectiveness of the tractor drive device 200 of the present invention. Moreover, the arrangement of the gearworks in the main gearbox 210 greatly simplifies the operation of the subject tractor drive device 200. All four split-sheave roller assemblies 280 are geared together advancing and retracting the flexible lance or hose 125 in the same direction, at the same speed and driven by a single drive motor 205. Moreover, the flexible lance or hose 125 can be fed either longitudinally (i.e., inline with its length) into the roller assemblies 280 of the tractor drive device 200 or laterally by temporarily removing or pivoting the upper or lower clamp housing 230, 240 out of the way. Moreover, a flexible lance or hose 125 pre-fitted with a tool having a diameter larger than the entrance diameter of the stub tube clamp fitting 220 to be easily inserted laterally into the roller assemblies 280 of the tractor drive device 200 when the front half 222 of the stub tube clamp fitting 220 is either be removed completely or pivoted out of the way.

It will now be evident to those skilled in the art that there has been described herein an improved tractor drive device that enables greater flexibility and control. Although the invention hereof has been described by way of a preferred embodiment, it will be evident that other adaptations and modifications can be employed without departing from the spirit and scope thereof. For example, the motor could be controlled in part by a computerized sensor attached to the encoder device to automate repetitive tasks. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A tractor drive device for advancing and retracting a flexible lance, the tractor drive device comprising:

a motor driven gearworks contained in a main gearbox, a first and second sets of roller assemblies configured in a side-by-side arrangement and connected to and selectively driven by the gearworks, wherein each roller assembly set comprises an upper and a lower roller assembly configured in a fixed vertical arrangement, wherein each roller assembly comprises an adjustable split sheave configuration that includes a first roller half having a first contact face and a second roller half having an opposing second contact face and a means for independently closing a gap between the first and second roller halves so that the opposing contact faces of said first and second roller halves engage the surface of said flexible lance, clamping the flexible lance between the upper and lower roller assembly.

2. The tractor drive device of claim 1, wherein each of said opposing contact faces of said first and second roller halves is beveled at an acute angle.

3. The tractor drive device of claim 1, wherein each roller assembly is connected to said gearworks by a spindle connected to a separate gear in said gearworks and projecting through said gearbox.

4. The tractor drive device of claim 3, wherein each roller assembly includes a spindle mechanism that rotatively connects the said first and second roller halves.

5. The tractor drive device of claim 4, wherein the spindle mechanism comprises an adjustable preload mechanism having a threaded rod connected to a spindle, wherein said threaded rod is captured coaxially within a tubular sleeve housed in a tubular main housing containing a biased mechanism for adjusting the length of the spindle projecting out of said tubular main housing.

6. The tractor drive device of claim 5, wherein the biased mechanism comprises a preload washer rotatively coupled to a threaded portion of said tubular sleeve, a preload sleeve wheel fixably attached to a smooth portion of said tubular sleeve, and a wheel spacing knob connected to said preload sleeve wheel and rotatively coupled to said threaded rod.

7. The tractor drive device of claim 3, wherein each roller assembly comprises:

a first gearbox hub attached to a separate gear in said gearworks which connects to said spindle mechanism, wherein said first roller half is attached to a hub portion of said main gearbox hub;

a second gearbox hub connected to said spindle mechanism, wherein said second gearbox hub includes means for engaging a second roller half;

a means for adjusting the lateral distance between the first roller half and the second roller half.

8. The tractor drive device of claim 7, wherein said first gearbox hub is attached to a main gearbox gear by means of key secured within a recess of the first gearbox hub and a keyjoint formed within a central aperture of said main gearbox gear.

9. The tractor drive device of claim 7, wherein said spindle mechanism comprises a splined shaft spindle.

10. The tractor drive device of claim 9, wherein said second gearbox hub includes a splined bore which connects and engages said splined shaft spindle.

11. The tractor drive device of claim 7, wherein said means for adjusting the lateral distance between the first roller half and the second roller half comprises an adjustable preload mechanism connected to said spindle, wherein said adjustable preload mechanism adjusts the length of the spindle mechanism projecting through said gearbox.

12. The tractor drive device of claim 11, wherein the adjustable preload mechanism comprises a threaded rod connected to the spindle, wherein said threaded rod is captured coaxially within a tubular sleeve housed in a tubular main housing containing a biased mechanism for adjusting the length of the spindle projecting out of said tubular main housing.

13. The tractor drive device of claim 7, wherein said means for adjusting the lateral distance between the first roller half and the second roller half comprises an adjustable clamping mechanism that adjusts distance between the first roller half and the second roller half.

14. The tractor drive device of claim 13, wherein the adjustable clamping mechanism comprises a rack and pinion device that adjusts distance between the first roller half and the second roller half.

15. The tractor drive device of claim 1 wherein said motor driven gearworks comprises an electric motor.

16. The tractor drive device of claim 15 wherein the said electric motor is contained in a sealed housing.

17. The tractor drive device of claim 16 wherein the sealed motor housing is pressurized with an inert gas.

18. The tractor drive device of claim 16 further comprising a tubular frame fixably attached to the main gearbox and the sealed motor housing.

19. The tractor drive device of claim 15 further comprising a ninety-degree gearbox connecting the motor to the gearworks.

20. The tractor drive device of claim 1 further comprising a safety cover which covers the four roller assemblies.

21. The tractor drive device of claim 20, wherein the safety cover comprises individual safety covers configured about each roller assembly, wherein each individual safety cover includes a perforated circular segment cover guard selectively attached to the main gearbox.

22. The tractor drive device of claim 21, wherein each said individual safety cover is attached to said main gearbox by affixing said perforated circular segment cover guard to an inboard and outboard frame element connected to the main gearbox by a threaded rod and wingnut.

23. The tractor drive device of claim 20, wherein said safety cover comprises an upper clamp housing and a lower clamp housing.

24. The tractor drive device of claim 23, further comprising a latching mechanism attached to said upper and lower clamp housings.

25. The tractor drive device of claim 23, wherein said upper and lower clamp housings each contains an adjustable clamping mechanism for adjusting the lateral distance between the first roller half and the second roller half.

26. The tractor drive device of claim 25, wherein said adjustable clamping mechanism comprises a lateral traversing rod configured in said clamp housing, said traversing rod having a pinion gear formed on opposing ends that are enmeshed in a rack gear formed on a portion of two connector rods extending from said clamp housing, wherein a distal end of each connector rod is attached to said main gearbox.

27. The tractor drive device of claim 26, wherein said adjustable clamping mechanism further comprises a worm gear mechanism configured on the lateral traversing rod, said worm gear mechanism having a worm gear wheel co-aligned and fixably attached to said lateral traversing rod and enmeshed with a screw thread gear that is connected to an adjustment means configured on a front facing section of said clamp housing.

28. The tractor drive device of claim 1 further comprising at least one stub tube clamp fitting configured on a side of said main gearbox.

29. The tractor drive device of claim 28 wherein said stub tube clamp fitting comprises a front half and rear half which can be selectively detached from one another by means of bolt fasteners, hinges and draw fasteners.

30. The tractor drive device of claim 1 further comprising an encoder device configured between said first and second sets of roller assemblies.

* * * * *